United States Patent [19]

Yamamoto et al.

[11] 3,925,364

[45] Dec. 9, 1975

[54] BENZODIAZEPINE DERIVATIVES

[75] Inventors: Hisao Yamamoto; Shigeho Inaba, both of Nishinomiya; Tadashi Okamoto, Ashiya; Toshiyuki Hirohashi, Kobe; Kikuo Ishizumi, Minoo; Michihiro Yamamoto, Takarazuka; Isamu Maruyama, Minoo; Kazuo Mori, Kobe; Tsuyoshi Kobayashi, Minoo, all of Japan

[73] Assignee: Sumitomo Chemical Company, Ltd., Osaka, Japan

[22] Filed: Aug. 13, 1973

[21] Appl. No.: 387,713

Related U.S. Application Data

[62] Division of Ser. No. 762,341, Sept. 16, 1968, Pat. No. 3,828,027.

[30] Foreign Application Priority Data

| Oct. 9, 1967 | Japan | 42-65104 |
|---|---|---|
| Oct. 18, 1967 | Japan | 42-67354 |
| Nov. 2, 1967 | Japan | 42-70794 |
| Nov. 2, 1967 | Japan | 42-70796 |
| Nov. 2, 1967 | Japan | 42-70798 |
| Nov. 6, 1967 | Japan | 42-71598 |
| Nov. 8, 1967 | Japan | 42-72078 |
| Dec. 9, 1967 | Japan | 42-79166 |
| Dec. 15, 1967 | Japan | 42-80514 |
| Dec. 21, 1967 | Japan | 42-82273 |
| Jan. 10, 1968 | Japan | 43-1501 |
| Sept. 22, 1967 | Japan | 42-60952 |
| Sept. 27, 1967 | Japan | 42-62424 |
| Sept. 27, 1967 | Japan | 42-62425 |
| Sept. 27, 1967 | Japan | 42-62426 |
| Sept. 27, 1967 | Japan | 42-62427 |
| Sept. 27, 1967 | Japan | 42-62428 |
| Sept. 27, 1967 | Japan | 42-62429 |
| Sept. 27, 1967 | Japan | 42-62430 |
| Oct. 9, 1967 | Japan | 42-65102 |

[52] U.S. Cl. ............... 260/239.3 D; 424/244
[51] Int. Cl.² ............ C07D 243/24; C07D 243/36
[58] Field of Search ............... 260/239.3 D

[56] References Cited
UNITED STATES PATENTS

| 3,284,503 | 11/1966 | McMillan et al. | 260/239.3 D |
|---|---|---|---|
| 3,304,313 | 2/1967 | McMillan et al. | 260/239.3 D |
| 3,192,199 | 6/1965 | McMillan et al. | 260/239.3 D |

OTHER PUBLICATIONS

Sternbach et al. "Some Aspects of Structure–Activity Relationship in Psychotropic Agents of the 1,4-Benzodiazepine Series" A Symposium Held at the Regional Research Laboratory, Hyderbad, India, CSIR, New Delhi, India (1966).

*Primary Examiner*—Henry R. Jiles
*Assistant Examiner*—Robert T. Bond
*Attorney, Agent, or Firm*—Stevens, Davis, Miller & Mosher

[57] ABSTRACT

The process for producing benzodiazepine derivatives useful for tranquilizer,

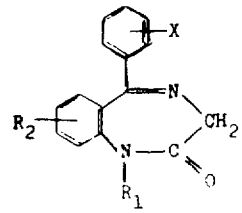

wherein $R_1$ is hydrogen, $C_1 \sim C_3$ alkyl group or $C_4 \sim C_7$ cyclohexylmethyl group and $R_2$ is hydrogen or halogens and X is halogens.

2-Amino-methylindole derivatives or their salts

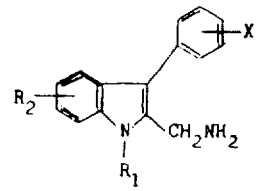

wherein $R_1$, $R_2$ and X respectively have the same meanings as above is allowed to react with an appropriate oxidizing agent, such as for example, chromium trioxide.

3 Claims, No Drawings

BENZODIAZEPINE DERIVATIVES

This is a division of application Ser. No. 762,341 filed Sept. 16, 1968, now U.S. Pat. No. 3,828,027.

The present invention relates to a process for preparing benzodiazepine derivatives. More particularly, the invention pertains to a novel process for producing benzodiazepine derivatives represented by the formula [I]

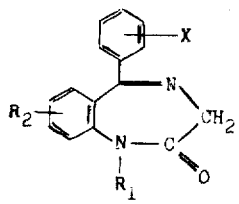

wherein $R_1$ represents a hydrogen atom, a lower alkyl group having 1-3 carbon atoms or a cycloalkylmethyl having 4-7 carbon atoms, and $R_2$ represents a hydrogen atom or a halogen atom, and X represents a halogen atom.

That is, the invention relates to a process, according to which benzodiazepine derivatives represented by the formula [I] are readily obtained by reacting 2-aminomethylindole derivatives represented by the formula [II] or their salts

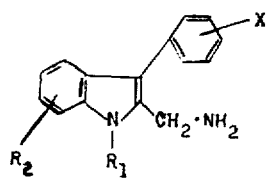

wherein $R_1$, $R_2$ and X respectively have the same meanings as defined above, or their salts with an appropriate oxidizing agent.

The benzodiazepine derivatives represented by the formula [I] are known as a remarkably effective tranquilizer, muscle relaxant, anti-convulsant and hypnotic.

A few processes for producing the benzodiazepine derivatives have been described. For instance, which is one of the most useful procedures by now, a benzodiazepine derivative is obtained in a poor yield by reacting a 2-aminobenzophenone derivative with glycine hydrochloride or glycine ethyl ester (German Patent No. 1,145,626).

A benzodiazepine derivative is also prepared by treating a chloroacetamidobenzophenone with ammonia. [Sternbach et al.: Journal of Organic Chemistry 27, 3788 (1962) and German Patent No. 1,136,709].

On the contrary to these procedures, to our astonishment, we have found that a benzodiazepine derivative having the formula [I] can be prepared smoothly and economically in high yield and in high purity by reacting a 2-aminomethyl-indole derivative having the formula [II] or their salt with an appropriate oxidizing agent. Such surprising process from a 5-membered ring compound to a 7-membered ring compound due to ring expansion reaction has not heretofore been described in any literature. Therefore, the novel process of the present invention is unobvious from the known method of the similar processes, and moreover very much useful and unexpected procedure.

These novel starting materials, 2-aminomethylindole derivatives were prepared easily by the reduction of indole-2-carboxamide derivatives or indole-2-carbonitrile derivatives.

These indole-2-carboxamide derivatives are also novel compounds, which were prepared by the amidation of indole-2-carboxylic acid derivatives in good yield. Further, the indole-2-carboxylic acid derivatives are novel, which is obtained, for example, by the cyclization of benzene diazonium compounds with ester derivatives of α-benzyl-β-keto acid.

All of these processes proceed smoothly and give the objective products in high yield, so these procedures are very much useful in practice.

One object of the present invention is to provide a novel process for preparing benzodiazepine derivatives represented by the formula [I].

Another object is to provide a novel process for producing the salts of benzodiazepine derivatives by treating the benzodiazepine derivatives of the formula [I] with a mineral acid such as hydrochloric acid, sulfuric acid, nitric acid, phosphoric acid, and the like, or organic acid sich as maleic acid, fumaric acid, succinic acid, formic acid, or acetic acid, and the like.

A further object of the present invention is to provide novel indole derivatives, novel phenylhydrazone derivatives and benzene diazonium derivatives and process for preparing the same.

Other objects of the present invention will be apparent from the following description.

In order to accomplish these objects, the present invention provides a process for preparing benzodiazepine derivatives represented by the formula [I], which comprises reacting a 2-aminomethylindole derivative represented by the formula [II] or its salt with an oxidizing agent.

Further the present invention provides a process for producing salts of benzodiazepine derivatives of the formula [I], which comprises reacting a 2-aminomethylindole derivative of the formula [II] or its salt with an oxidizing agent to yield the benzodiazepine derivative of the formula [I] and reacting the benzodiazepine derivative of the formula [I] with a mineral acid such as hydrochloric acid, sulfuric acid, nitric acid, phosphoric acid, or organic acid such as maleic acid, fumaric acid, succinic acid, formic acid, acetic acid, and the like.

Still further, the present invention provides novel phenylhydrazone derivatives and benzene diazonium derivatives and a process for production thereof.

Furthermore, the present invention provides novel indole derivatives, that is, 2-aminomethylindole derivatives, indole-2-carbonitrile derivatives, indole-2-carboxamide derivatives, indole-2-carboxylic acid derivatives, and a process for production thereof.

In carrying out the process for preparing the benzodiazepine derivatives according to the present invention, 2-aminomethylindole derivatives represented by the formula [II] or their salts are reacted with an appropriate oxidizing agent, for example, ozone, hydrogen peroxide, peracid (e.g. performic acid, peracetic acid and perbenzoic acid), chromic acid and potassium permanganate. The oxidizing agent used in the process of the invention is not limited, however, only to those exemplified above. The reaction is generally readily effected at room temperature. Higher or lower temperature is sometimes found more satisfactory.

Chromium trioxide is preferred as oxidizing agent. The reaction may preferably be carried out in the presence of a solvent. The solvent depends upon the oxidizing agents used, and is selected from water, acetone, carbon tetrachloride, acetic acid, sulfuric acid and any other solvents which do not react substantially with any of the reactants. The oxidizing agent is used in a stoichiometric amount or more. The reaction temperature used depends upon the oxidizing agent used.

In the case which the oxidation is carried out using chromium trioxide in the presence of acetic acid, it is preferable to use 2–3 times a stoichiometric amount of chromium trioxide and to conduct the reaction at room temperature. A 2-aminomethylindole derivative or its salt such as hydrochloride, hydrobromide, sulfate, nitrate, acetate and the like is dissolved or suspended in a solvent and an oxidizing agent is added thereto with stirring. The reaction is generally completed within about 24 hours.

The desired benzodiazepine derivative can be separated from the reaction mixture in a crude form by extraction after neutralization or without neutralization and by evaporation to dryness. The product may be further purified, if desired, by recrystallization from an appropriate solvent such as ethanol, isopropanol and the like in a standard manner.

Thus, for example, the invention includes benzodiazepine derivatives such as 5-(o-chlorophenyl)-1,3-dihydro-2H-1,4-benzodiazepine-2-one,
5-(o-fluorophenyl)-1,3-dihydro-2H-1,4-benzodiazepine-2-one,
5-(o-chlorophenyl)-7-chloro-1,3-dihydro-2H-1,4-benzodiazepine-2-one,
5-(o-fluorophenyl)-7-chloro-1,3-dihydro-2H-1,4-benzodiazepine-2-one
5-(o-bromophenyl)-7-chloro-1,3-dihydro-2H-1,4-benzodiazepine-2-one,
5-(m-chlorophenyl)-7-chloro-1,3-dihydro-2H-1,4-benzodiazepine-2-one,
5-(p-chlorophenyl)-7-bromo-1,3-dihydro-2H-1,4-benzodiazepine-2-one,
1-methyl-5-(o-chlorophenyl)-7-chloro-1,3-dihydro-2H-1,4-benzodiazepine-2-one,
1-methyl-5-(o-fluorophenyl)-7-chloro-1,3-dihydro-2H-1,4-benzodiazepine-2-one,
1-methyl-5-(o-fluorophenyl)-7-bromo-1,3-dihydro-2H-1,4-benzodiazepine-2-one,
1-ethyl-5-(o-fluorophenyl)-7-chloro-1,3-dihydro-2H-1,4-benzodiazepine-2-one,
1-propyl-5-(o-fluorophenyl)-7-chloro-1,3-dihydro-2H-1,4-benzodiazepine-2-one,
1-cyclopropylmethyl-5-(o-fluorophenyl)-1,3-dihydro-2H-1,4-benzodiazepine-2-one,
1-cyclopropylmethyl-5-(o-chlorophenyl)-1,3-dihydro-2H-1,4-benzodiazepine-2-one,
1-cyclopropylmethyl-5-(o-fluorophenyl)-7-chloro-1,3-dihydro-2H-1,4-benzodiazepine-2-one,
1-cyclopentylmethyl-5-(o-fluorophenyl)-7-chloro-1,3-dihydro-2H-1,4-benzodiazepine-2-one,
1-cyclopropylmethyl-5-(o-chlorophenyl)-7-chloro-1,3-dihydro-2H-1,4-benzodiazepine-2-one,
1-cyclopropylmethyl-5-(o-fluorophenyl)-9-chloro-1,3-dihydro-2H-1,4-benzodiazepine-2-one,
1-cyclopropylmethyl-5-(o-fluorophenyl)-7-bromo-1,3-dihydro-2H-1,4-benzodiazepine-2-one,
1-cyclobutylmethyl-5-(o-fluorophenyl)-7-chloro-1,3-dihydro-2H-1,4-benzodiazepine-2-one,
1-cyclopentylmethyl-5-(o-fluorophenyl)-7-bromo-1,3-dihydro-2H-1,4-benzodiazepine-2-one, and
1-cyclohexylmethyl-5-(o-fluoropheny)-7-chloro-1,3-dihydro-2H-1,4-benzodiazepine-2-one.

The salt of the benzodiazepine derivative [I] may be prepared by reacting the benzodiazepine derivative [I] with the acid in a suitable solvent. The salts may be also obtained from the reaction mixture by a standard procedure.

2-Aminomethylindole derivatives represented by the formula [II], the starting material in the above process, are novel compounds. These compounds are readily produced, for example, by the process that follows.

At the first step for producing the 2-aminomethylindole derivatives [II], a phenylhydrazone derivative represented by the formula [V]

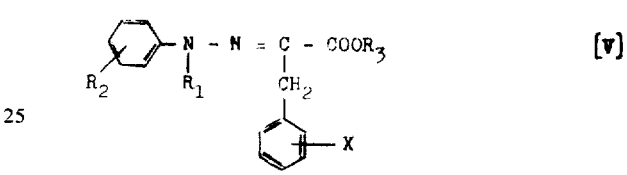

wherein $R_1$, $R_2$ and X respectively have the same meanings as defined above and $R_3$ represents a hydrogen atom, an alkyl group having 1–4 carbon atoms or a benzyl group, is readily obtained by reacting a phenylpyruvic acid derivative represented by the formula [III]

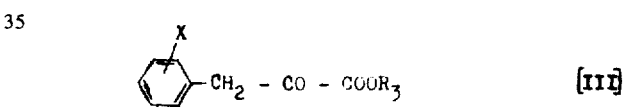

wherein $R_3$ and X have the same meaning as defined above, with a phenylhydrazine derivative represented by the formula [IV] or its salt

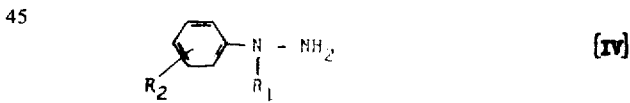

wherein $R_1$ and $R_2$ respectively have the same meanings as defined above.

The reaction is preferably carried out in the presence of an inert solvent such as lower alkanols, e.g. methanol, ethanol and the like. The reaction proceeds at a room temperature although a slightly elevated temperature may be employed to increase the rate of reaction.

Thus, for example, the invention includes phenylhydrazone derivatives such as o-chlorophenylpyruvic acid phenylhydrazone,
o-fluorophenylpyruvic acid phenylhydrazone,
o-fluorophenylpyruvic acid p-chlorophenylhydrazone,
methyl o-chlorophenylpyruvate p-chlorophenylhydrazone,
ethyl o-chlorophenylpyruvate p-chlorophenylhydrazone,
tertiary butyl o-fluorophenylpyruvate p-chlorophenylhydrazone ethyl o-fluorophenylpyruvate p-chlorophenylhydrazone, methyl o-fluorophenylpyruvate N¹-methyl-p-chlorophenylhydrazone, ethyl o-fluorophenylpyruvate N¹-methyl-p-chlorophenylhydrazone, o-fluorophenylpyruvic acid N¹-methyl-p-chlorophenylhydrazone, o-fluorophenylpyruvic acid N¹-ethyl-p-chlorophenylhydrazone, o-fluorophenylpyruvic acid N¹-n-propyl-p-chlorophenylhydrazone and o-fluorophenylpyruvic acid N¹-isopropyl-p-chlorophenylhydrazone.

Further, it is also possible to obtain the phenylhydrazone derivatives represented by the formula [V']

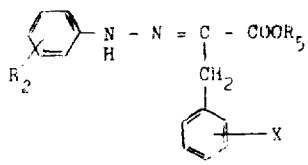   [V']

wherein $R_2$ and X have the same meanings as defined above and $R_5$ represents an alkyl having 1–4 carbon atoms or benzyl group, by reacting ester derivatives of β-keto acid represented by the formula [VII]

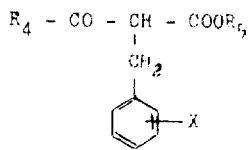   [VII]

wherein $R_4$ represents an alkyl group having 1–4 carbon atoms and $R_5$ and X have the same meanings as defined above, with a benzene diazonium salt represented by the formula [VIII]

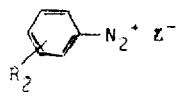   [VIII]

wherein Z represents a halogen atom and $R_2$ has the same meaning as defined above. In this reaction, novel azo derivatives represented by the formula [XXII]

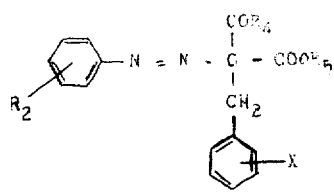

[XXII]

wherein $R_2$, $R_4$, $R_5$ and X have the same meanings as mentioned above, are sometimes obtained as intermediates, from which the phenylhydrazone derivatives represented by the formula [V'] are prepared by heating.

In carrying out the process of the present invention, ester derivatives of β-keto acid represented by the formula [VII] may be allowed to react with the benzene diazonium salt represented by the formula [VII] in the presence of a base, for example, such as sodium hydroxide, potassium hydroxide, sodium methylate and sodium ethylate, in an appropriate solvent, for example, water, methanol and ethanol, whereby the reacton readily proceeds. Because of unstability of the benzene diazonium salt, the reaction is preferably carried out below 10°C.

Thus, for example, the invention includes phenylhydrazone derivatives such as methyl o-chlorophenylpyruvate p-chlorophenylhydrazone, methyl o-fluorophenylpyruvate p-chlorophenylhydrazone, ethyl o-fluorophenylpyruvate p-chlorophenylhydrazone, tertiary butyl o-fluorophenylpyruvate p-chlorophenylhydrazone and ethyl o-chlorophenylpyruvate p-chlorophenylhydrazone.

At the second step, novel indole-2-carboxylic acid derivates represented by the formula [VI]

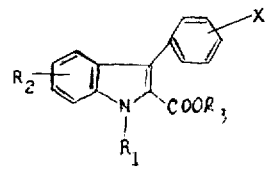   [VI]

wherein $R_1$, $R_2$, $R_3$ and X respectively have the same meanings as defined above, are readily obtained by treating these phenylhydrazone derivatives [V] in a solvent or solvent mixture. As solvents, there may be employed any solvent which is inert to the system as represented lower alkanols such as methanol, ethanol, isopropanol and tertiary butanol, aromatic solvents such as benzene, toluene, xylene, organic acids such as formic acid and acetic acid or other organic solvent such as acetone, chloroform and cyclohexane. The reaction is preferably carried out in the presence of an acid; mineral acids such as hydrochloroic acid, hydrobromic acid, sulfuric acid, phosphoric acid and polyphosphoric acid, organic acid such as formic acid and acetic acid or other acidic reagents, including Lewis acids such as zinc chloride, iron chloride, aluminum chloride and boron fluoride. The reaction is generally effected at elevated temperature.

Thus, for example, the invention includes indole-2-carboxylic acid derivatives such as, 3-(o-chlorophenyl)-5-chloro-indole-2-carboxylic acid,
3-(o-fluorophenyl)-5-chloro-indole-2-carboxylic acid,
3-(o-bromophenyl)-5-chloro-indole-2-carboxylic acid,
3-(m-chlorophenyl)-5-chloro-indole-2-carboxylic acid,
3-(p-chlorophenyl)-5-chloro-indole-2-carboxylic acid, methyl 3-(o-fluorophenyl)-5-chloro-indole-2-carboxylate, ethyl 3-(o-fluorophenyl)-5-chloro-indole-2-carboxylate tertiary butyl 3-(o-fluorophenyl)-5-chloro-indole-2-carboxylate, 3-(o-flurophenyl)-6 (or 4)-chloro-indole-2-carboxylic acid, 3-(o-fluorophenyl)-7-chloro-indole-2-carboxylic acid, benzyl 3-(o-fluorophenyl)-5-chloro-indole-2-carboxylate, ethyl 1-cyclopropylmethyl-3-(o-flurorphenyl)-indole-2-carboxylate, 1-cyclopropylmethyl-3-(o-fluorophenyl)-5-chloro-indile-2-carboxylic acid methyl 1-cyclopropylmethyl-3-(o-fluorophenyl)-5-chloro-indole-2-carboxylate, ethyl 1-cyclopropylmethyl-3-(o-fluorophenyl)-5-chloro-indole-2-carboxylate, tertiary butyl 1-cyclopropylmethyl-3-(o-fluorophenyl)-5-chloro-indole-2-carboxylate, benzyl 1-cyclopropylmethyl-3-(o-fluorophenyl)-5-chloro-indole-2-carboxylate, ethyl 1-cyclopropylmethyl-3-(o-fluorophenyl)-5-bromo-indole-2-carboxylate, ethyl 1-cyclopropylmethyl-3-(o-fluorophenyl)-5fluoro-indole-2-carboxylate, methyl 1-cyclopropylmethyl-3-(o-fluorophenyl)-6 (or 4)-chloro-indole-2-carboxylate ethyl 1-cyclopropylmethyl-3-(o-fluorophenyl)-7-chloro-indole-2-carboxylate, ethyl 1-cyclobutylmethyl-3-(o-fluorophenyl)-5-chloro-indole-2-carboxylate, ethyl 1-cyclopentylmethyl-3-(o-fluorophenyl)-5-chloro-indole-2-carboxylate and ethyl 1-cyclohexylmethyl-3-(o-fluorophenyl)-5-chloro-indole-2-carboxylate.

Still further, the novel indole-2-carboxylic acid derivatives represented by the formula [VI] are readily obtained by reacting the ketone derivatives represented by the formula [III] with the phenylhydrazine derivative represented by the formula [IV] or its salt. The reaction mentioned above can be carried out in a solvent, for example, an alkanol such as methanol, ethanol, isopropanol and tertiary butanol, aromatic hydrocarbon such as benzene, toluene, xylene, and the like organic acid such as formic acid and acetic acid, and the like, or an other inert organic solvent such as acetone, chloroform, cyclohexane, and the like, preferably in the presence of an acid catalyst, for example, mineral acid such as hydrogen chloride hydrogen bromide, sulfuric acid, phosphoric acid, polyphosphoric acid, and the like, organic acid such as formic acid and acetic acid, Lewis acid such as zinc chloride, iron chloride, aluminum chloride, boron fluoride, and the like, or cation exchange resin. When a salt of the phenylhydrazine derivative [IV] is used as a starting material, the reaction proceeds even in the absence of the above-mentioned acid catalyst to give the objective indole derivatives [VI]. As salts of the phenylhydrazine derivatives [IV], following salt are useful: for example, inorganic acid salt such as hydrochloride, hydrobromide and sulfate or organic acid salt such as acetate and oxalate.

The reaction usually proceeds at room temperature, but, if desired, the reaction may be controlled by heating or cooling, though the heating and cooling are not always necessary.

Thus, for example, the invention includes indole derivatives such as, 3-(o-chlorophenyl)-5-chloro-indole-2-carboxylic acid, 3-(o-bromophenyl)-5-chloro-indole-2-carboxylic acid, 3-(o-fluorophenyl)-5-chloro-indole-2-carboxylic acid, 3-(m-chlorophenyl)-5-chloro-indole-2-carboxylic acid, 3-(p-chlorophenyl)-5-chloro-indole-2-carboxylic acid, 1-cyclopropylmethyl-3-(o-fluorophenyl)-indole-2-carboxylic acid, ethyl 1-cyclopropylmethyl-3-(o-fluorophenyl)-indole-2-carboxylate, 1-cyclorpropylmethyl-3-(o-fluorophenyl)-5-chloro-indole-2-carboxylic acid, methyl 1-cyclopropylmethyl-3-(o-fluorophenyl)-5-chloro-indole-2-carboxylate, ethyl 1-cyclopropylmethyl-3-(o-fluorophenyl)-5-chloro-indole-2-carboxylate, tertiary butyl 1-cyclopropylmethyl-3-(o-fluorophenyl)-5-chloro-indole-2-carboxlate, benzyl 1-cyclopropylmethyl-3-(o-fluorophenyl)-5-chloro-indole-2-carboxylate, ethyl 1-cyclopropylmethyl-3-(o-fluorophenyl)-5-bromo-indole-2-carboxylate, methyl 1-cyclopropylmethyl-3-(o-fluorophenyl)-6 (or 4)-chloro-indole-2-carboxylate, ethyl 1-cyclopropylmethyl-3-(o-chlorophenyl)-7-chloro-indole-2-carboxylate, ethyl 1-cyclopropylmethyl-3-(o-chlorophenyl)-5-chloro-indole-2-carboxylate, ethyl 1-cyclopropylmethyl-3-(o-bromophenyl)-5-chloro-indole-2-carboxylate, ethyl 1-cyclopropylmethyl-3-(m-chlorophenyl)-5-chloro-indole-2-carboxylate, ethyl 1-cyclopropylmethyl-3-(p-chlorophenyl)-5-chloro-indole-2-carboxylate, ethyl 1-cyclobutylmethyl-3-(o-fluorophenyl)-5-chloro-indole-2-carboxylate, ethyl 1cyclopentylmethyl-3-(o-fluorophenyl)-5-chloro-indole-2-carboxylate, ethyl 1-cyclohexymethyl-3-(o-fluorophenyl)-5-chloro-indole-2-carboxylate, methyl 1-methyl-3-(o-fluorophenyl)-5-chloro-indole-2-carboxylate, 1-ethyl-3-(o-fluorophenyl)-5-chloro-indole-2-carboxylic acid, 1-methyl-3-(o-fluorophenyl)-5-chloro-indole-2-carboxylic acid, methyl 1-n-propyl-3-(o-fluorophenyl)-5-chloroindole-2-carboxylate, 1-methyl-3-(o-fluorophenyl)-5-bromoindole-2-carboxylic acid, methyl 3-(o-fluorophenyl)-5-chloroindole-2-carboxylate, and 1-isobutyl-3-(o-fluorophenyl)-5-chloro-indole-2-carboxylic acid.

Furthermore, novel indole-2-carboxylic acid ester derivatives represented by the formula [IX]

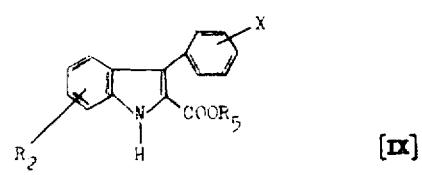

[IX]

wherein $R_2$, $R_5$ and X have the same meanings as defined above, is obtained by treating ester derivative of β-keto acid represented by the formula [VII] with a benzene diazonium salt derivative represented by the general formula [VIII].

In carrying out this process, the ester derivatives of β-keto acid represented by the aforesaid formula [VII] may be allowed to react with the benzene diazonium salt represented by the aforesaid formula [VIII] in the presence of a base, such as sodium hydroxide, potassium hydroxide, sodium methylate and sodium ethylate in an appropriate solvent, such as water, methanol and ethanol, whereby the reaction readily proceeds. Because of unstability of the benzene diazonium salt, it is preferable to carry out the reaction below 10°C., more preferably below 5°C. Thereafter, treatment of the reaction product with an acid causes formation of the indole-2-carboxylic acid ester derivative represented by the aforesaid formula [IX]. However, an intermediate produced during this reaction is preferably once isolated and treated with an acid in an organic solvent to yield very readily the aimed indole-2-carboxylic acid ester derivative [IX] in good yield. In this reaction, an acid, for example, mineral acid such as hydrogen chloride, hydrogen bromide, sulfuric acid, phosphoric acid, polyphosphoric acid, and the like, or other Lewis acid such as zinc chloride, ferrous chloride, aluminum chloride, stannous chloride, boron fluoride and the like is suitable.

In this reaction, following solvents are most usefu, for example, alkanols such as methanol, ethanol and isopropanol, aromatic hydrocarbons such as benzene, toluene and xylene, organic acids such as formic acid and acetic acid, or common organic solvents such as acetone, chloroform and cyclohexane.

Thus, for example, the invention includes indole2-carboxylic acid ester derivatives such as
methyl 3-(o-fluorophenyl)-5-chloro-indole-2-carboxylate
ethyl 3-(o-chlorophenyl)-5-chloro-indole-2-carboxylate,
ethyl 3-(o-fluorophenyl)-5-chloroindole-2-carboxylate,
ethyl 3-(o-bromophenyl)-5-chloro-indole-2-carboxylate,
ethyl 3-(m-chlorophenyl)-5-chloro-indole-2-carboxylate,
ethyl 3-(p-chlorophenyl)-5-chloro-indole-2-carboxylate,
tertiary butyl 3-(o-fluorophenyl)-5-chloro-indole-2-carbxylate,
benzyl 3-(o-fluorophenyl)-5-chloro-indole-2-carboxylate,
ethyl 3-(o-fluorophenyl)-6 (or 4)-chloro-indole-2-carboxylate and
ethyl 3-(o-fluorophenyl)-7 -chloro-indole-2-carboxylate.

The azo derivatives represented by the formula [XXII] can give an indole-2-carboxylic acid ester derivative represented by the formula [IX] according to the same process as an indole-2-carboxylic acid ester derivative is prepared from a phenyl hydrazone derivative mentioned above.

Furthermore, an indole-2-carboxylic acid derivative represented by the formula [XI]

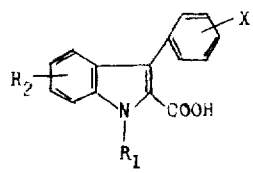

[XI]

wherein $R_1$, $R_2$ and X each has the same meanings as defined above, can be produced by converting an indole-2-carboxylic acid ester derivative represented by the formula [X']

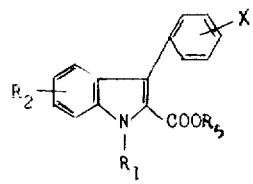

[X']

wherein $R_1$, $R_2$, $R_5$ and X have the same meanings as defined above, to its corresponding acid.

The indole-2-carboxylic acid ester derivative represented by the aforesaid formula [X'] is treated in water and/or alcohols such as methanol and ethanol, preferably in the presence of a hydrolyzing agent, to readily give the indole-2-carboxylic acid derivative represented by the formula [IX].

As a hydrolyzing agent, following compounds are useful; for example, mineral acid such as hydrochloric acid and sulfuric acid, alkali metal such as sodium, potassium and lithium, alkali metal hydroxide such as sodium hydroxide and potassium hydroxide, alkali metal carbonate such as sodium carbonate and potassium carbonate, alkaline earth metal hydroxide such as barium hydroxide, and calcium hydroxide, and ammonium compound such as ammonium hydroxide or the like. Alkali metal hydroxide or alkaline earth metal hydroxide is preferred. The reaction can be carried out even at room temperature, preferably at an elevated temperature.

Furthermore, the indole-2-carboxylic acid ester derivative [X'] can also to hydrolyzed by treating the same in an organic acid such as acetic acid and propionic acid in the presence of a mineral acid.

Alternatively, when $R_5$ is a tertiary butyl group, the indole-2-carboxylic acid ester derivative [X'] can also be converted to the objective carboxylic acid [XI] by heating the same together with a mineral acid or toluene-sulfonic acid. When $R_5$ is a benzyl group, the benzyl group can also be removed by hydrogenolysis. The objective substance can be obtained as a metal salt or ammonium salt.

Thus, for example, the invention inclues following indole-2-carboxylic acid derivatives such as 3-(o-chlorophenyl)-5-chloro-indole-2-carboxylic acid,
3-(o-fluorophenyl)-5-chloro-indole-2-carboxylic acid,
3-(m-chlorophenyl)-5-chloro-indole-2-carboxylic acid,
3-(p-chlorophenyl)-5-chloro-indole-2-carboxylic acid,
3-phenyl-6 (or 4)-chloro-indole-2-carboxylic acid,
3-phenyl-7-chloro-indole-2-carboxylic acid,
1-methyl-3-(o-chlorophenyl)-5-chloro-indole-2-carboxylic acid,
1-methyl-3-(o-bromophenyl)-5-chloro-indole-2-carboxylic acid, 1-methyl-3-(o-fluorophenyl)-5-chloro-indole-2-carboxylic acid,
1-ethyl-3-(o-fluorophenyl)-5-chloro-indole-2-carboxylic acid,
1-cyclopropylmethyl-3-(o-chlorophenyl)-5-chloro-indole-2-carboxylic acid,
1-cyclopropylmethyl-3-(o-fluorophenyl)-5-bromo-indole-2-carboxylic acid,
1-cyclopropylmethyl-3-(o-fluorophenyl)-6 (or 4)-chloro-indole-2-carboxylic acid,
1-cyclopropylmethyl-3-(o-fluorophenyl)-5-chloro-indole-2-carboxylic acid,
1-cyclopropylmethyl-3-(o-fluorophenyl)-indole-2-carboxylic acid,
1-cyclobutylmethyl-3-(o-fluorophenyl)-5-chloro-indole-2-carboxylic acid,
1-cyclopropylmethyl-3-(m-chlorophenyl)-5-chloro-indole-2-carboxylic acid,
1-cyclopropymethyl-3-(p-chlorophenyl)-5-chloro-indole-2-carboxylic acid,
1-cyclobutylmethyl-3-(o-fluorophenyl)-5-bromo-indole-2-carboxylic acid,
1-cyclopentymethyl-3-(o-fluorophenyl)-5-chloro-indole-2-carboxylic acid and
1-cyclohexylmethyl-3-(o-fluorophenyl)-5-chloro-indole-2-carboxylic acid.

Novel N-alkylindole-2-carboxylic acid derivatives represented by the general formula [X]

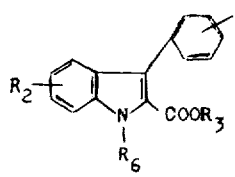

wherein $R_2$, $R_3$ and X have the same meanings as defined above and $R_6$ represents a lower alkyl having 1–3 carbon atoms or a cycloalkylmethyl having 4–7 carbon atoms, is obtained by reacting an indole-2-carboxylic acid derivative represented by the formula [VI']

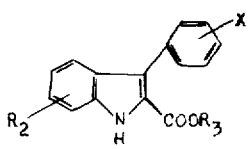

wherein $R_2$, $R_3$ and X have the same meanings as defined above, with alkylating agents. The alkylation is carried out by treating an indole-2-carboxylic acid derivative represented by the formula [VI'] in the presence of an alkaline condensing agent, if necessary, or with an alkaline condensing agent to form an alkaline metal salt thereof, and then treating with an alkylating agent. As the alkaline condensing agent, following compounds are useful, for example, alkali metal, alkaline earth metal, alkali metal hydride, alkaline earth metal hydride, alkali metal hydroxide, alkaline earth metal hydroxide, alkali metal amide and alkaline earth metal amide.

Alkylation of an indole-2-carboxylic acid ester derivative represented by the formula [VI'] is carried out by contacting it with following compounds, for example, alkyl halide such as methyl iodide, ethyl bromide, ethyl iodide, butyl bromide and cyclopropylmethyl bromide, alkyl sulfate such as dimethyl sulfate and diethyl sulfate, and such alkyl aromatic sulfonate as methyl paratoluenesulfonate and cyclopropylmethyl paratoluenesulfonate.

Thus, for example, the invention includes indole-2-carboxylic acid derivatives such as, methyl 1-methyl-3-(o-chloropheny)-5-chloro-indole-2-carboxylate,
methyl 1-methyl-3-(o-fluorophenyl)-5-chloro-indole-2-carboxylate,
ethyl 1-methyl-3-(o-bromophenyl)-5-chloro-indole-2-carboxylate
ethyl 1-methyl-3-(o-chlorophenyl)-5-chloro-indole-2-carboxylate,
ethyl 1-methyl-3-(m-chlorophenyl)-5-chloro-indole-2-carboxylate,
ethyl 1-methyl-3-(p-chlorophenyl)-5-chloro-indole-2-carboxylate,
ethyl 1-methyl-3-(o-fluorophenyl)-5-chloro-indole-2-carboxylate,
benzyl 1-methyl-3-(o-fluorophenyl)-5-chloro-indole-2-carboxylate,
ethyl 1ethyl-3-(o-fluorophenyl-5-chloro-indole-2-carboxylate,
ethyl 1-propyl-3-(o-fluorophenyl)-5-chloro-indole-2-carboxylate,
ethyl 1-methyl-3-(o-fluorophenyl)-6 (or 4)-chloro-indole-2-carboxylate,
methyl 1-methyl-3-(o-chlorophenyl)-7-chloro-indole-2-carboxylate,
ethyl 1-methyl-3-(o-chlorophenyl)-5-bromo-indole-2-carboxylate,
ethyl 1-cyclopropylmethyl-3-(o-chlorophenyl)-indole-2-carboxylate,
methyl 1-cyclopropylmethyl-3-(o-fluorophenyl)-5-chloro-indole-2-carboxylate,
ethyl 1-cyclopropylmethyl-3-(o-fluorophenyl)-5-chloro-indole-2-carboxylate,
benzyl 1-cyclopropylmethyl-3-(o-fluorophenyl)-5-chloro-indole-2-carboxylate,
ethyl 1-cyclopropylmethyl-3-(o-fluorophenyl)-5-bromo-indole-2-carboxylate,
ethyl 1-cyclopropylmethyl-3-(m-chlorophenyl)-5-chloro-indole-2-carboxylate,
ethyl 1-cyclopropylmethyl-3-(p-chlorophenyl)-5-chloro-indole-2-carboxylate,
ethyl 1-cyclobutylmethyl-3-(o-fluorophenyl)-5-chloro-indole-2-carboxylate,
ethyl 1-cyclopentylmethyl-3-(o-fluorophenyl)-5-chloro-indole-2-carboxylate,
ethyl 1-cyclohexylmethyl-3-(o-fluorophenyl)-5-chloro-indole-2-carboxylate,
1-methyl-3-(o-chlorophenyl)-indole-2-carboxylic acid,
1-methyl -3-(o-fluorophenyl)-indole-2-carboxylic acid,
1-methyl-3-(o-chlorophenyl)-5-chloro-indloe-2-carboxylic acid and
1-methyl-3-(o-fluorophenyl)-5-chloro-indole-2-carboxylic acid.

Further, N-alkylindole-2-carboxylic acid derivatives [X] in which $R_3$ is an alkyl or benzyl group is converted to indole-2-carboxylic acid derivative [XI'].

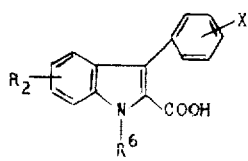

wherein $R_2$, $R_6$ and X have the same meanings as defined above.

At the third step, a novel indole-2-carboxylic acid derivative represented by the formula [XII]

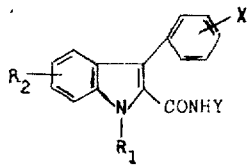

wherein $R_1$, $R_2$ and X each has the same meanings as defined above and Y represents a hydrogen atom or hydroxy, can be obtained by reacting the indole-2-carboxylic acid derivative [XI] or its reactive derivative, for example, acid halide, ester or the like with ammonia or hydroxylamine. As the reactive derivative, acid halide, ester and acid anhydride are useful.

In this reaction, following acid halides can be used, for example, acid chloride and acid bromide. Following esters can be used, for example, tertiary butyl ester, benzyl ester or paranitrophenyl ester. Following acid anhydrides can be used, for example, a mixed anhydride which include mixed anhydrides described in "Organic Reactions", Vol. 12, p. 157 (1962), for example, lower aliphatic anhydride, particularly that of acetic acid or an anhydride of carboxylic acid half esters obtained by reacting an acid represented by the formula [XI] with methyl chloroformate, ethyl chloroformate, isobutyl chloroformate, alkyl chloroformate, benzyl chloroformate or chloroformic acid paranitrophenyl ester.

In carrying out this process, the indole-2-carboxylic acid derivative represented by the aforesaid formula [XI] or its reactive derivative such as acid halide, ester or acid anhydride is allowed to react with ammonia.

In the present reaction, the presence of a solvent is preferable. In the reaction following solvents can be used, for example, alcohols such as methanol, ethanol and organic solvents such as acetone, benzene, toluene, xylene, chlorobenzene and chloroform.

In the present reaction, ammonia can be used by introducing gaseous ammonia to a reaction mixture or adding alcoholic ammonia (such as methanolic ammonia, ethanolic ammonia) or aqueous ammonia to a reaction mixture.

Because the reaction usually proceeds at room temperature, heating or cooling is not always necessary. However, the reaction may be controlled by heating or cooling, if desired.

Furthermore, when the indole-2-carboxylic acid derivative represented by the formula [XI] or its reactive derivative is heated with hydroxylamine or its salt in an appropriate solvent, for example, in alcohol, the corresponding hydroxamic acid derivative is obtained.

Thus, for example, the invention includes indole-2-carboxylic acid derivatives [XII] such as 1-cyclopropylmethyl-3-(o-chlorophenyl)-5-chloro-indole-2-carboxamide, 1-cyclopropylmethyl-3-(o-fluorophenyl)-5-bromo-indole-2-carboxamide,
1-cyclopropylmethyl-3-(o-fluorophenyl)-5-chloro-indole-2-carboxamide,
1-cyclopropylmethyl-3-(o-fluorophenyl)-6 (or 4)-chloro-indole-2-carboxamide,
1-cyclopropylmethyl-3-(o-fluorophenyl)-5-chloro-indole-2-hydroxamic acid,
1-cyclopropylmethyl-3-(o-fluorophenyl)-7-chloro-indole-2-carboxamide,
1-cyclobutylmethyl-3-(o-fluorophenyl)-5-chloro-indole-2-carboxamide,
1-cyclopentylmethyl-3-(o-fluorophenyl)-5-chloro-indole-2-carboxamide,
1-cyclohexylmethyl-3-(o-fluorophenyl)-5-chloro-indole-2-carboxamide,
1-cyclohexylmethyl-3-(o-fluorophenyl)-5-chloro-indole-2-carboxamide,
3-(o-chlorophenyl)-5-chloro-indole-2-carboxamide,
3-(o-bromophenyl)-5-chloro-indole-2-carboxamide,
3-(o-fluorophenyl)-5-chloro-indole-2-carboxamide,
3-(p-chlorophenyl)-5-chloro-indole-2-carboxamide,
3-(m-chlorophenyl)-5-chloro-indole-2-carboxamide,
3-(o-fluorophenyl)-5-bromo-indole-2-carboxamide,
3-(o-fluorophenyl)-5-fluoro-indole-2-carboxamide,
3-(o-fluorophenyl)-6 (or 4)-chloro-indole-2-carboxamide,
3-(o-fluorophenyl)-7-chloro-indole-2-carboxamide,
1-methyl-3-(o-fluorophenyl)-5-chloro-indole-2-hydroxamic acid,
1-methyl-3-(o-chlorophenyl)-5-chloro-indole-2-carboxamide,
1-methyl-3-(o-fluorophenyl)-5-bromo-indole-2-carboxamide,
1-methyl-3-(o-fluorophenyl)-5-fluoro-indole-2-carboxamide and
1-ethyl-3-(o-fluorophenyl)-5-chloro-indole-2-carboxamide.

An indole-2-carboxylic halide represented by the formula [XIII]

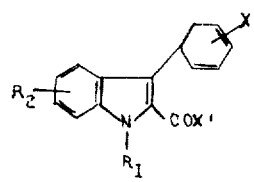

wherein $R_1$, $R_2$ and X respectively have the same meanings as defined above and X' represents a halogen atom, is obtained by reacting the indole-2-carboxylic acid derivative [XI] with a halogenating agent.

In carrying out this process, the indole-2-carboxylic acid derivative represented by the aforesaid formula [XI] is treated together with a halogenating agent in the absence of a solvent or in an inert solvent, such as benzene, toluene, ether, chloroform, methylene chloride and carbon tetrachloride. As the halogenating agent, following compounds are useful; for example, thionyl chloride, phosphorous trichloride, phosphorous tribromide, phosphorous pentachloride, phosphorous oxychloride and phosgene. In this case, the reaction rate can also be accelerated by adding a basic substance such as pyridine and dimethylformamide. Furthermore, in this process, a free carboxylic acid can be used as a starting material, but the metal salt, such as sodium salt, may also be used.

After removing the solvent and excess of reacting agents, the reaction product is obtained, if necessary, by treatment such as extraction with an inert solvent to give the objective product. In this case, isolation or further purification of this product is not always easy. However, in leading the indole-2-carboxylic halide, for example, to indole-2-carboxylic acid amide, isolation or purification is not always necessary and crude products or a reaction mixture will be used as it is for carrying out the reaction.

Thus, for example, the invention includes indole-2-carboxylic acid halide derivatives such as 3-(o-chlorophenyl)-indole-2-carboxylic chloride,
3-(o-fluorophenyl)-indole-2-carboxylic chloride,
3-(o-chlorophenyl)-5-chloro-indole-2-carboxylic chloride,
3-(o-fluorophenyl)-5-chloro-indole-2-carboxylic chloride,
3-(p-chlorophenyl)-5-chloro-indole-2-carboxylic chloride,
3-(o-fluorophenyl)-5-chloro-indole-2-carboxylic bromide,
3-(o-fluorophenyl)-5-bromo-indole-2-carboxylic chloride,
3-(o-fluorophenyl)-5-fluoro-indole-2-carboxylic chloride,
3-(o-fluorophenyl)-5-chloro-indole-2-carboxylic bromide,
3-(o-fluorophenyl)-indole-2-carboxylic bromide,
3-(o-fluorophenyl)-6 (or 4)-chloro-indole-2-carboxylic chloride,
3-(o-fluorophenyl)-7-chloro-indole-2-carboxylic chloride,
1-methyl-3-(o-chlorophenyl)-5-chloro-indole-2-carboxylic chloride,
1-methyl-3-(o-fluorophenyl)-5-chloro-indole-2-carboxylic chloride,
1-ethyl-3-(o-fluorophenyl)-5-chloro-indole-2-carboxylic chloride,
1-cyclopropylmethyl-3-(o-fluorophenyl)-5-chloro-indole-2-carboxylic chloride,
1-cyclobutylmethyl-3-(o-fluorophenyl)-5-chloro-indole-2-carboxylic chloride,
1-cyclopentylmethyl-3-(o-fluorophenyl)-5-chloro-indole-2-carboxylic chloride and
1-cyclohexylmethyl-3-(o-fluorophenyl)-5-chloro-indole-2-carboxylic chloride.

Furthermore, an indole derivative represented by the formula [XV]

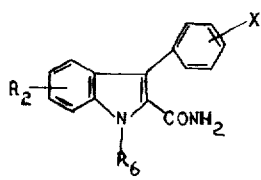

[XV]

wherein $R_2$, $R_6$ and X have the same meanings as defined above, can be obtained by alkylating an amide derivative represented by the general formula [XIV]

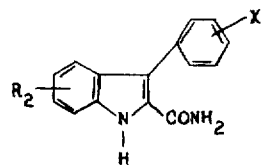

[XIV]

wherein $R_2$ and X have the same meaning as identified above.

In practising this process, the indole derivatives represented by the aforesaid formula [XIV] give their alkaline metal salt by treating the same in the presence of an alkaline condensing agent, and then the resultant alkaline metal salt may be allowed to react with an alkylating agent or cycloalkylmethylating agent. As the alkaline condensing agent, following compounds are useful: for example, alkali metal, alkaline earth metal, alkali metal hydride, alkaline earth metal hydride, alkali metal hydroxide, alkali earth metal hydroxide, alkali metal amide and alkaline earth metal amide.

Thus, for example, the invention includes compounds such as 1-methyl-3-(o-chlorophenyl)-5-chloro-indole-2-carboxamide,
1-methyl-3-(o-fluorophenyl)-5-chloro-indole-2-carboxamide,
1-methyl-3-(p-chlorophenyl)-5-chloro-indole-2-carboxamide,
1-methyl-3-(o-fluorophenyl)-5-bromo-indole-2-carboxamide,
1-ethyl-3-(o-fluorophenyl)-indole-2-carboxamide,
1-cyclopropylmethyl-3-(o-fluorophenyl)-indole-2-carboxamide and
1-cyclopropylmethyl-3-(o-fluorophenyl)-5-chloro-indole-2-carboxamide.

At the final step for producing the 2-aminomethyl-indole derivatives [II], a novel 2-aminomethylindole derivative represented by the aforesaid formula [II]

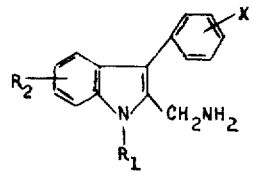

[II]

wherein $R_1$, $R_2$ and X respectively have the same meanings as defined above, is obtained by converting an indole-2-carboxylic acid derivative represented by the formula [XVI]

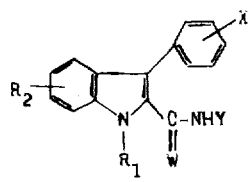

[XVI]

where $R_1$, $R_2$ and X respectively have the same meanings as defined above and W represents an oxygen or sulfur atom, and Y is hydrogen atom or hydroxyl group.

In the formula [XVI], when W is a sulfur atom (i.e. indole-2-carboxylic thioamide derivative), the compound [XVI] is produced, for example, by reacting indole-2-carboxylic amide derivative [XII] with phosphorus pentasulfide.

In practising this process, the reduction of the indole-2-carboxylic derivative represented by the formula [XVI] is carried out according to usual method of reduction, such as electrolytic reduction, reduction by alkali metal in alcohols, catalytic reduction in the presence of a catalyst such as platinum, palladium, nickel catalyst and the like, or reduction with use of metal hydride complex compound. Particularly preferable reduction agents are a metal hydride complex, for example, lithium-aluminum hydride.

the aminomethyl compound [II] obtained by the above process can be converted to the corresponding salt by treating the same with an acid, for example, mineral acid such as hdyrochloric acid, hydrobromic acid, sulfuric acid and phosphoric acid.

Thus, for example, the invention includes 2-aminomethyl-indole derivatives such as 2-aminomethyl-3-(o-chlorophenyl)-indole,
2-aminomethyl-3-(o-fluorophenyl)-indole,
2-aminomethyl-3-(o-chlorophenyl)-5-chloro-indole,
2-aminomethyl-3-(o-fluorophenyl)-5-bromo-indole,
2-aminomethyl-3-(o-fluorophenyl)-6 (or 4)-chloro-indole,
2-aminomethyl-3-(o-fluorophenyl)-7-chloro-indole,
1-methyl-2-aminomethyl-3-(o-fluorophenyl)-indole,
1-methyl-2-aminomethyl-3-(o-chlorophenyl)-indole,
1-methyl-2-aminomethyl-3-(o-chlorophenyl)-5-chloro-indole,
1-ethyl-2-aminomethyl-3-(o-fluorophenyl)-5-chloro-indole,
1-methyl-2-aminomethyl-3-(o-fluorophenyl)-5-bromo-indole,
1-methyl-2-aminomethyl-3-(o-fluorophenyl)-5-chloro-indole,
1-cyclopropylmethyl-2-aminomethyl-3-(o-fluorophenyl)-indole,
1-cyclopropylmethyl-2-aminomethyl-3-(o-fluorophenyl)-5-chloro-indole,
1-cyclopropylmethyl-2-aminomethyl-3-(o-fluorophenyl)-5-bromo-indole,
1-cyclopropylmethyl-2-aminomethyl-3-(o-chlorophenyl)-6 (or 4)-chloro-indole,
1-cyclopropylmethyl-2-aminomethyl-3-(o-bromophenyl)-5-chloro-indole,
1-cyclobutylmethyl-2-aminomethyl-3-(o-fluorophenyl)-5-chloro-indole,
1-cyclopropylmethyl-2-aminomethyl-3-(o-fluorophenyl)-5-bromo-indole,
1-cyclopropylmethyl-2-aminomethyl-3-(o-fluorophenyl)-5-fluoro-indole and their hydrochlorides, hydrobromides, sulfates, nitrates and phosphates.

Alternatively, the 2-aminomethyl indoles represented by the formula [II] can also be prepared in good yield by heating the corresponding amide derivatives [XVIII] to the corresponding carbonitrile derivatives [XIX] and reducing the said carbonitrile derivatives.

wherein $R_1$, $R_2$ and X respectively have the same meanings as defined above. More particularly, according to the dehydration of an indole-2-carboxamide derivative represented by the formula [XVIII], an indole-2-carbonitrile derivative [XIX] is obtained.

In practising this process, an indole-2-carboxamide derivative represented by the aforesaid formula [XVIII] is heated, preferably in the presence of a dehydrating agent to give an indole-2-carbonitrile derivative [XIX]. As the dehydrating agent, following compounds are useful: for example, phosphorous halide such as phosphorous oxychloride, phosphorous trichloride and phosphorous pentachloride or acid chloride such as p-toluenesulfonyl chloride, methylsulfonyl chloride, acetyl chloride, thionyl chloride, benzoyl chloride and carbobenzoxy chloride in the presence or absence of an inert solvent.

Thus, for example, the invention includes indole-2-carbonitrile derivatives such as 3-(o-chlorophenyl)-indole-2-carbonitrile,
3-(o-fluorophenyl)-indole-2-carbonitrile,
3-(o-chlorophenyl)-5-chloro-indole-2-carbonitrile,
3-(o-fluorophenyl)-5-chloro-2-indole-carbonitrile,
3-(o-bromophenyl)-5-chloro-2-indole-carbonitrile,
3-(p-chloro-phenyl)-5-chloro-2-indole-carbontrile,
3-(o-fluorophenyl)-5-bromo-indole-2-carbonitrile,
3-(o-fluorophenyl)-5-fluoro-indole-2-carbontrile,
3-(o-fluorophenyl)-6 (or 4)-chloro-indole-2-carbonitrile,
3-(o-fluorophenyl)-7-chloro-indole-2-carbonitrile,
1-methyl-3-(o-fluorophenyl)-5-chloro-indole-2-carbonitrile,
1-methyl-3-(o-chlorophenyl)-5-chloro-indole-2-carbonitrile,
1-ethyl-3-(o-fluorophenyl)-5-chloro-indole-2-carbonitrile,
1-cyclopropylmethyl-3-(o-fluorophenyl)-indole-2-carbonitrile,
1-cyclopropylmethyl-3-(o-fluorophenyl)-5-chloro-indole-2-carbonitrile,
1-cyclobutylmethyl-3-(o-fluorophenyl)-5chloro-indole-2-carbonitrile,
1-cyclopentylmethyl-3-(o-fluorophenyl)-5-chloro-indole-2-carbonitrile and
1-cyclohexylmethyl-3-(o-fluorophenyl)-5-chloro-indole-2-carbonitrile.

Subsequently, by reducing an indole-2-carbonitrile derivative represented by the formula [XIX], a 2-aminomethyl indole derivative represented by the aforesaid formula [II] can readily be obtained. More particularly, reduction of the indole-2-carbonitrile derivative represented by the aforesaid general formula [XIX] may be carried out by a usual method, for exam-

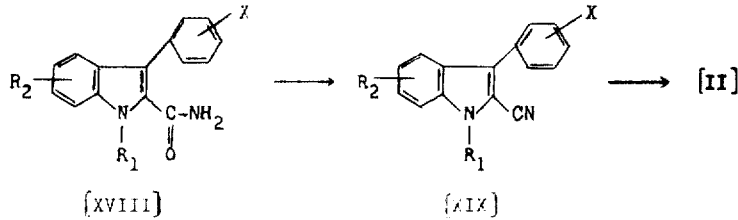

ple, electrolytic reduction, reduction by alkali metal in alcohol, catalytic reduction by palladium, nickel or platinum, reduction by chromium acetate-alkali, or reduction by metal hydride complex. Particularly, reduction by metal hydride complex, for example, aluminum-lithium hydride, boron hydride, a mixed hydride, is commercially useful from points of simplicity and selectivity.

The 2-aminomethyl-indole derivative [II] can be converted to the corresponding salt by treating with, for example, a mineral acid such as hydrochloric acid, hydrobromic acid, sulfuric acid, phosphoric acid, or organic acid such as acetic acid.

Thus, for example, the invention includes 2-aminomethyl-indole derivatives such as 2-aminomethyl-3-(o-fluorophenyl)-indole,
2-aminomethyl-3-(o-chlorophenyl)-5-chloro-indole,
2-aminomethyl-3-(o-fluorophenyl)-5-chloro-indole,
2-aminomethyl-3-(o-fluorophenyl)-5-bromo-indole,
2-aminomethyl-3-(o-fluorophenyl)-5-fluoro-indole,
2-aminomethyl-3-(o-fluorophenyl)-6 (or 4)-chloro-indole,
2-aminomethyl-3-(o-fluorophenyl)-7-chloro-indole,
1 -methyl-2-aminomethyl-3-(o-chlorophenyl)-5-chloro-indole,
1-methyl-2-aminomethyl-3-(o-fluorophenyl)-5-chloro-indole,
1-ethyl-2-aminomethyl-3-(o-fluorophenyl)-5-chloro-indole,
1-cyclopropylmethyl-2-aminomethyl-3-(o-fluorophenyl)-indole,
1-cyclopropylmethyl-2-aminomethyl-3-(o-fluorophenyl)-5-chloro-indole,
1-cyclobutylmethyl-2-aminomethyl-3-(o-fluorophenyl)-5-chloro-indole,
1-cyclopentylmethyl-2-aminomethyl-3-(o-fluorophenyl)-5-chloro-indole,
1-cyclohexylmethyl-2-aminomethyl-3-(o-fluorophenyl)-5-chloro-indole
and their hydrochlorides, hydrobromides, sulfates, phosphates and acetates.

Otherwise 2-aminomethylindole derivatives represented by the formula,

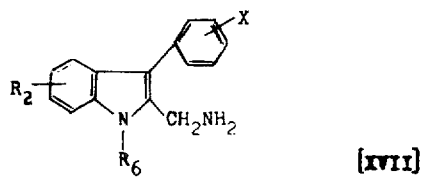

[XVII]

wherein $R_2$, $R_6$ and X have the same meanings as defined above, are produced from novel N-alkyl-indole-2-carbonitrile derivatives represented by the formula [XXI]

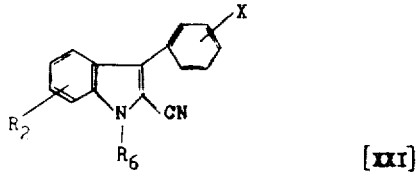

[XXI]

wherein $R_2$, $R_6$ and X respectively have the same meanings as identified above, which are obtained by alkylation of an indole-2-carbonitrile derivative represented by the formula [XX]

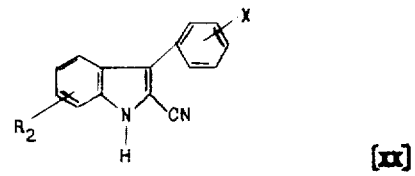

[XX]

wherein $R_2$ and X have the same meaning as defined above.

In practising the present process, the indole-2-carbonitrile derivative represented by the aforesaid formula [XX] is treated with an alkylating agent, if necessary, in the presence of an alkaline condensing agent, or after formation of alkali metal salts by treating with an alkaline condensing agent. As the alkylating agent, following compounds are useful: for example, alkyl halide such as methyl iodide, ethyl bromide and butyl bromide cyclopropylmethylbromide, alkyl-sulfuric ester such as dimethyl sulfate, diethyl sulfate or aromatic sulfonic alkylester such as methyl paratoluenesulfonate and cyclopropylmethyl paratoluene sulfonate. As the alkaline condensing agent, following compounds are useful: for example, alkali metal, alkaline earth metal, alkali metal hydride, alkaline earth metal hydride, alkali metal hydroxide, alkaline earth metal hydroxide, alkali metal amide and alkaline earth metal amide.

Thus, for example, the invention includes N-alkylindole-2-carbonitrile derivatives such as 1-methyl-3-(o-fluorophenyl)-indole-2-carbonitrile,
1-methyl-3-(o-fluorophenyl)-5-chloro-indole-2-carbonitrile,
1-methyl-3-(o-chlorophenyl)-5-chloro-indole-2-carbonitrile,
1-methyl-3-(o-fluorophenyl)-6 (or 4)-chloro-indole-2-carbonitrile,
1-methyl-3-(o-fluorophenyl)-7-chloro-indole-2-carbonitrile,
1-methyl-3(o-fluorophenyl)-5-bromo-indole-2-carbonitrile,
1-ethyl-3-(o-fluorophenyl)-5-chloro-indole-2-carbonitrile and
1-propyl-3-(o-fluorophenyl)-5-chloro-indole-2-carbonitrile.

Subsequently, the above-mentioned indole-2-carbonitrile derivatives [XXI] are reduced according to the aforesaid process, 2-aminomethyl-3-phenyl-indole derivatives represented by the formula [XVII]

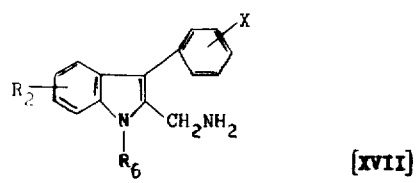

[XVII]

wherein $R_2$, $R_6$ and X each has the same meaning as defined above are obtained.

If the 2-aminomethyl-3-phenyl-indole derivatives [XVII] are treated with an oxidizing agent as mentioned before to give the benzodiazepine derivatives represented by the formula [I'], which is the objective product of the present invention,

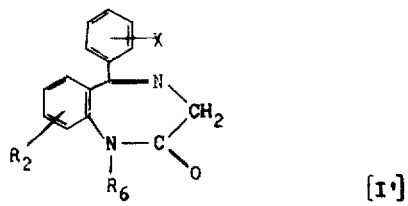

[I']

wherein $R_2$, $R_6$ and X have the same meanings as defined above.

The following examples also are illustrative of the methods by which the products of this invention can be prepared and are not to be considered as limiting the invention to the particular procedural conditions employed or to the particular compounds prepared thereby.

EXAMPLE 1

A mixture of 20 g. of o-chlorophenylpyruvic acid, 300 ml. of ethanol and 14 g. of p-chlorophenyl-hydrazine was heated for 30 min. After the reaction is completed, the solvent was removed under reduced pressure to give p-chloro-phenyl-hydrazone of o-chlorophenylpyruvic acid almost quantitatively. Melting point 124° - 125°C. Infrared absorption spectrum, $\nu_{max}^{Paraffin}$: 3260, 1700, 1600 cm$^{-1}$.

EXAMPLE 2

According to the similar procedure to that of Example 1, there was obtained a phenylpyruvic acid phenylhydrazone from phenylhydrazine and phenylpyruvic acid.

The following phenylhydrazone derivatives were obtained by the procedure of Example 1.

Methyl o-fluorophenylpyruvate p-chlorophenylhydrazone, ethyl o-chlorophenylpyruvate p-chlorophenylhydrazone, tertiary butyl o-fluorophenylpyruvate p-chlorophenylhydrazone, ethyl o-fluorophenylpyruvate p-chlorophenylhydrazone, methyl o-fluorophenylpyruvate $N^1$-methyl-p-chlorophenyl-hydrazone, ethyl o-fluorophenylpyruvate $N^1$-methyl-p-chlorophenylhydrazone, o-fluorophenylpyruvic acid $N^1$-methyl-p-chlorophenyl-hydrazone, o-fluorophenylpyruvic acid $N^1$-ethyl-p-chlorophenylhydrazone, o-fluorophenylpyruvic acid $N^1$-n-propyl-p-chlorophenylhydrazone, o-fluorophenylpyruvic acid $N^1$-iso-propyl-p-chlorophenylhydrazone and ethyl o-fluorophenylpyruvate $N^1$-cyclopropylmethylphenylhydrazone.

EXAMPLE 3

To an ice-cold solution of 99.4 g. of ethyl o-fluorobenzylacetoacetate in 420 ml. of ethanol was added dropwise 150 ml. of 50% aqueous potassium hydroxide solution on cooling, and then 80 ml. of ice-water was added to the mixture. To this mixture was added dropwise, diazonium salt solution prepared from 53.3 g. of p-chloroaniline, 180 ml. of conc. hydrochloric acid, 28.8 g. of sodium nitrite and 275 ml. of water, below 5°C. After addition, the reaction mixture was stirred below 5°C. The separated oily product solidified gradually, and the solid substance was then collected by filtration, washed with water and dried to give 128.4 g. (92.2%) of ethyl α-(o-fluorobenzyl)-α-(p-chlorophenyl-azo)-acetoacetate, m.p. 55° - 60°C. Recrystallization from ethanol was repeated for an analytical sample, m.p. 79° - 80°C. Infrared absorption spectrum, $\nu_{max}^{Paraffin}$: 1750, 1715, 1600, 1580, 1495 cm$^{-1}$.

Elementary analysis (for $C_{19}H_{18}ClFN_2O_3$):

|  | C | H | N | Cl |
|---|---|---|---|---|
| Calculated: | 61.54% | 4.86% | 7.56% | 9.58% |
| Found: | 61.20% | 4.53% | 7.31% | 9.56% |

The ethyl o-fluorobenzyl acetoacetate used as a starting materials in this example was obtained as follows: To a solution of 150 ml. of ethyl acetoacetate in 400 ml. of dry benzene, was added 33 g. of calcium oxide in small portions. The mixture was heated under reflux condition for several hours. After cooling, a deposited solid was collected by filtration, washed with benzene and dried to give ethyl calcioacetoacetate, m.p. 220° - 221°C.

A mixture of 87 g. of o-fluorobenzyl bromide, 137 g. of ethyl calcioacetoacetate and 300 ml. of dimethylformamide was heated at 75°C. for 6 hours. After completion of the reaction, the solvent was removed by distillation under reduced pressure, and 150 ml. of ethanolic hydrogen chloride was added to the residue. The mixture was stirred at room temperature to decompose the unreacted salt. The solvent was removed by distillation under reduced pressure, and 200 ml. of water was added to the residue. The separated yellow oil product was extracted with ether, and the organic layer was washed with water, dried over sodium sulfate and concentrated, and the residue was distilled under reduced pressure to give 99.4 g. (90.8%) of ethyl o-fluorobenzyl acetoacetate, b.p. 164° - 167°C./23 mmHg. Infrared absorption spectrum, $\nu_{max}^{Paraffin}$: 1740, 1720, 1590, 1496 cm$^{-1}$.

Elementary analysis (for $C_{13}H_{15}FO_3$):

|  | C | H |
|---|---|---|
| Calculated: | 65.55% | 6.30% |
| Found: | 65.40% | 6.04% |

EXAMPLE 4

A mixture of 26.3 g. of p-chloroaniline, 69 g. of conc. hydrochloric acid and 50 ml. of water was heated into a solution and then cooled to 2°C. To the mixture was added dropwise a solution of 14.6 g. of sodium nitrite in water at 0° - 5°C. with stirring, and the resultant mixture was stirred at the same temperature for an additional 15 min. To the mixture was added portionwise 27.2 g. of sodium acetate at 0° - 5°C. The mixture was added dropwise to a chilled mixture of 47.6 g. of ethyl α-(o-fluorobenzyl) acetoacetate, 200 ml. of methanol and 33.7 g. of anhydrous potassium acetate below 5°C. with stirring. The reaction mixture was stirred for 2 hours below 5°C. The precipitate formed was collected by filtration, washed with water and dried in vacuo to yield 68.3 g. (90.7%) of ethyl α(o-fluorobenzyl)-α-(p-chlorophenylazo) acetoacetate, m.p. 74° - 77°C. The ethyl α-(o-fluorobenzyl) acetoacetate used as a starting material in this example was obtained as follows: To a suspension of 13.6 g. of sodium ethoxide in 100 ml. of dry toluene, was added dropwise 31.2 g. of ethyl aceto- acetate. To the mixture was added dropwise 54.6 g. of o-fluorobenzylbromide and the mixture was refluxed for 8 hours. The reaction mixture was cooled and filtered. The filtrate was concentrated and the residue was distilled under reduced pressure to give 36.7 g. of ethyl α(o-fluorobenzyl) acetoacetate, b.p. 159° - 161°C./19 mmHg.

The following compounds were similarly prepared:

Ethyl α-(o-chlorobenzyl)-α-(phenyl-azo) acetoacetate,
methyl α-(o-fluorobenzyl)-α-(p-chloro-phenyl-azo) acetoacetate,
tert.Butyl α-(o-fluorobenzyl)-α-(p-chloro-phenyl-azo) acetoacetate,
ethyl α-(o-fluorobenzyl)-α-(p-bromo-phenyl-azo) acetoacetate,
ethyl α-(o-fluorobenzyl)-α-(m-chloro-phenyl-azo) acetoacetate and
ethyl α-(o-chlorobenzyl)-α-(p-chloro-phenyl-azo) acetoacetate.

EXAMPLE 5

A mixture of 47.1 g. of p-chloroaniline, 118 ml. of conc. hydrochloric acid and 90 ml. of water was heated and then cooled below 0°C. To the mixture was added dropwise, a solution of 25.6 g. of sodium nitrite in 58 ml. of water below 5°C. with stirring. After addition, 43 g. of sodium acetate was added to the mixture. The resulting mixture was added dropwise to a chilled mixture of 93.6 g. of ethyl α-(o-chlorobenzyl) acetoacetate, 360 ml. of ethanol and 72 g. of anhydrous potassium acetate below 5°C., and the reaction mixture was stirred overnight below 5°C. To the reaction mixture was added 100 ml. of water and the separated product was extracted with ether. The ether solution was dried over sodium sulfate and concentrated to dryness under reduced pressure. The residue was washed with water and dried to give 78.8 g. of ethyl o-chlorophenylpyruvate p-chlorophenyl hydrazone, m.p. 123° - 125°C.

The ethyl α-(o-chlorobenzyl) acetoacetate used as a starting material in this example was obtained as follows: To a mixture of 97.5 g. of ethyl acetoacetate, 17.3 g. of metallic sodium and 370 ml. of absolute ethanol was added dropwise 133 g. of o-chlorobenzyl chloride under refluxing condition. Stirring was continued under refluxing condition for an additional 10 hours. The reaction mixture was cooled and filtered. The filtrate was concentrated and distilled under reduced pressure to give 138 g. of ethyl α-(o-chloro-benzyl) acetoacetate, b.p. 130° - 140°C./0.35 mmHg.

EXAMPLE 6

To a solution of 126.4 g. of ethyl α-(o-fluorobenzyl)-α-(p-chlorophenylazo) acetoacetate in 250 ml. of ethanol was introduced dry hydrogen chloride while the temperature was maintained below 70°C. with intermittent cooling. The mixture was stirred at room temperature for an hour, and then cooled with ice. After cooling to 0°C., the precipitate was collected by filtration, washed with cold ethanol and then with water successively, and dried to give 86.9 g. of ethyl 5-chloro-3-(o-fluorophenyl)-indole-2-carboxylate, m.p. 188° - 189°C. The analytical sample was recrystallized from ethanol, m.p. 188° - 189°C. Infrared absorption spectrum, $\nu_{max}^{Paraffin}$: 3300, 1690, 1550, 1492 cm$^{-1}$.

Elementary analysis (for $C_{17}H_{13}ClFNO_2$):

|  | C | H | N | Cl |
|---|---|---|---|---|
| Calculated: | 64.25% | 4.09% | 4.41% | 11.18% |
| Found: | 64.28% | 3.92% | 4.04% | 11.32% |

EXAMPLE 7

To a solution of 100 ml. of conc. sulfuric acid in 900 ml. of isopropanol was added 526.5 g. of ethyl α-(o-fluorophenyl)-α-(p-chlorophenylazo) acetoacetate and then the mixture was heated under refluxing condition for 4 hours with stirring. The reaction mixture was cooled and the precipitate was collected by filtration, washed with water and dried to give 336 g. of ethyl 5-chloro-3-(o-fluorophenyl)-indole-2-carboxylate, m.p. 180° - 186°C.

Recrystallization from ethanol the melting point was raised to 188° - 189°C.

The following compounds were similarly prepared:

Methyl 3-(o-fluorophenyl)-5-chloro-indole-2-carboxylate,
ethyl 3-(o-chlorophenyl)-5-chloro-indole-2-carboxylate,
tertiary butyl 3-(o-fluorophenyl)-5-chloro-indole-2-carboxylate,
benzyl 3-(o-fluorophenyl)-5-chloro-indole-2-carboxylate,
ethyl 1-cyclopropylmethyl-3-(o-fluorophenyl)-indole-2-carboxylate,
methyl 1-cyclopropylmethyl-3-(o-fluorophenyl)-5-chloro-indole-2-carboxylate,
ethyl 1-cyclopropylmethyl-3-(o-fluorophenyl)-5-chloro-indole-2-carboxylate,
tertiary butyl 1-cyclopropylmethyl-3-(o-chlorophenyl)-5-chloro-indole-2-carboxylate,
benzyl 1-cyclopropylmethyl-3-(o-fluorophenyl)-5-chloro-indole-2-carboxylate,
ethyl 1-cyclopropylmethyl-3-(o-fluorophenyl)-5-bromo-indole-2-carboxylate,
ethyl 1-cyclopropylmethyl-3-(o-fluorophenyl)-5-fluoro-indole-2-carboxylate,
methyl 1-cyclopropylmethyl-3-(o-fluorophenyl)-6 (or 4)-chloro-indole-2-carboxylate,
ethyl 1-cyclopropylmethyl-3-(o-fluorophenyl)-7-chloro-indole-2-carboxylate,
ethyl 1-cyclobutylmethyl-3-(o-fluorophenyl)-5-chloro-indole-2-carboxylate,
ethyl 1-cyclopentylmethyl-3-(o-fluorophenyl)-5-chloro-indole-2-carboxylate, and
ethyl 1-cyclohexylmethyl-3-(o-fluorophenyl)-5-chloro-indole-2-carboxylate.

EXAMPLE 8

A mixture of 78.8 g. of ethyl o-chlorophenylpyruvate p-chlorophenylhydrazone and 600 ml. of ethanol was heated to 70°C. into a solution. Dry hydrogen chloride gas was introduced to the solution for 1 hour below 70°C. with intermittent cooling. Stirring was continued at 50°C. for an additional 1 hour. After cooling, the precipitate formed was collected by filteration, washed with cold ethanol and then water, and dried to give 70.1 g. (93.4%) of ethyl 5-(o-chlorophenyl)-indole-2-carboxylate, m.p. 195° – 196°C. The analytical sample was recrystallized from ethanol, m.p. 196° – 196.5°C.

EXAMPLE 9

A mixture of 25.6 g. of p-chloroaniline, 64 ml. of conc. hydrochloric acid and 90 ml. of water was heated to a solution and then cooled at 0°C. To the mixture was added dropwise a solution of 13.9 g. of sodium nitrite in 29.6 ml. of water below 5°C., with stirring. After addition, 23.4 g. of sodium acetate was added to the mixture. The resulting mixture was added dropwise to a chilled mixture of 50.9 g. ethyl ester of α-(o-chlorobenzyl) acetoacetate, 200 ml. of methanol and 39.2 g. of anhydrous potassium acetate below 0°C. The reaction mixture was stirred for 3 hours below 5°C., and extracted with ether. The ethereal layer was dried over sodium sulfate and concentrated under reduced pressure to an oily substance, which was dissolved in 240 ml. of ethanol and dry hydrogen chloride gas was introduced to the solution for 20 min.. The mixture was stirred at 50° – 60°C. for 2 hours and then cooled to 0°C. After allowing to stand overnight at 0°C., the precipitates were collected by filtration, washed with cold ethanol and then water, and dried to yield 40 g. of ethyl 5-chloro-3-(o-chlorophenyl)-indole-2-carboxylate, m.p. 195°–196°C. The analytical sample was recrystallized from ethanol, m.p. 196° – 196.5°C. Infrared absorption spectrum, $\nu_{max}^{Paraffin}$: 3290, 1680 cm$^{-1}$.
Elementary analysis (for $C_{17}H_{13}O_2NCl_2$):

|  | C | H | N |
|---|---|---|---|
| Calculated: | 61.14% | 3.92% | 4.19% |
| Found: | 61.14% | 3.98% | 4.00% |

The following compounds were similarly prepared:

3-(o-chlorophenyl)-5-chloro-indole-2-carboxylic acid,
3-(o-bromophenyl)-5-chloro-indole-2-carboxylic acid,
3-(m-chlorophenyl)-5-chloro-indole-2-carboxylic acid,
3-(p-chlorophenyl)-5-chloro-indole-2-carboxylic acid,
1-cyclopropylmethyl-3-(o-fluorophenyl)-indole-2-carboxylic acid,
ethyl 1-cyclopropylmethyl-3-(o-fluorophenyl)-indole-2-carboxylate,
1-cyclopropylmethyl-3-(o-fluorophenyl)-5-chloro-indole-2-carboxylic acid,
methyl 1-cyclopropylmethyl-3-(o-fluorophenyl)-5-chloro-indole-2-carboxylate,
ethyl 1-cyclopropylmethyl-3-(o-fluorophenyl)-5-chloro-indole-2-carboxylate,
tertiary butyl 1-cyclopropylmethyl-3-(o-fluorophenyl)-5-chloro-indole-2-carboxylate,
benzyl 1-cyclopropylmethyl-3-(o-fluorophenyl)-5-chloro-indole-2-carboxylate,
ethyl 1-cyclopropylmethyl-3-(o-fluorophenyl)-5-bromo-indole-2-carboxylate,
methyl 1-cyclopropylmethyl-3-(o-fluorophenyl)-6 (or 4)-chloro-indole-2-carboxylate,
ethyl 1-cyclopropylmethyl-3-(o-chlorophenyl)-7-chloro-indole-2-carboxylate,
ethyl 1-cyclopropylmethyl-3-(p-chlorophenyl)-5-chloro-indole-2-carboxylate,
ethyl 1-cyclobutylmethyl-3-(o-fluorophenyl)-5-chloro-indole-2-carboxylate,
ethyl 1-cyclopentylmethyl-3-(o-fluorophenyl)-5-chloro-indole-2-carboxylate,
ethyl 1-cyclohexylmethyl-3-(o-fluorophenyl)-5-chloro-indole-2-carboxylate,
methyl 1-methyl-3-(o-fluorophenyl)-5-chloro-indole-2-carboxylate,
1-ethyl-3-(o-fluorophenyl)-5-chloro-indole-2-carboxylic acid,
1-methyl-3-(o-chlorophenyl)-5-chloro-indole-2-carboxylic acid,
ethyl 1-n-propyl-3-(o-fluorophenyl)-5-chloro-indole-2-carboxylate,
1-methyl-3-(o-fluorophenyl)-5-bromo-indole-2-carboxylic acid,
1-methyl-3-(o-chlorophenyl)-indole-2-carboxylic acid,
methyl 3-(o-fluorophenyl)-5-chloro-indole-2-carboxylate,
1-isobutyl-3-(o-fluorophenyl)-5-chloro-indole-2-carboxylic acid.

EXAMPLE 10

A mixture of 14 g. of p-chlorophenylhydrazine, 18.2 g. of o-fluorophenyl-pyruvic acid 300 ml. of acetic acid and 300 ml. of conc. hydrochloric acid was heated under refluxing condition for 1 hour. The reaction mixture was concentrated under reduced pressure and diluted with water to give 5-chloro-3-(o-fluorophenyl)-indole-2-carboxylic acid, m.p. 252° – 254°C. (decomp.).

The following compounds were similarly prepared:
3-(o-chlorophenyl)-5-chloro-indole-2-carboxylic acid,
3-(o-bromophenyl)-5-chloro-indole-2-carboxylic acid,
3-(o-fluorophenyl)-5-chloro-indole-2-carboxylic acid,
3-(m-chlorophenyl)-5-chloro-indole-2-carboxylic acid,
3-(p-chlorophenyl)-5-chloro-indole-2-carboxylic acid,
1-cyclopropylmethyl-3-(o-fluorophenyl)-indole-2-carboxylic acid,
ethyl 1-cyclopropylmethyl-3-(o-fluorophenyl)-indole-2-carboxylate,
1-cyclopropylmethyl-3-(o-fluorophenyl)-5-chloro-indole-2-carboxylic acid,
methyl 1-cyclopropylmethyl-3-(o-fluorophenyl)-5-chloro-indole-2-carboxylate,
ethyl 1-cyclopropylmethyl-3-(o-fluorophenyl)-5-chloro-indole-2-carboxylate, tertiary butyl 1-cyclopropylmethyl-3-(o-fluorophenyl)-5-chloro-indole-2-carboxylate,
benzyl 1-cyclopropylmethyl-3-(o-fluorophenyl)-5-chloro-indole-2-carboxylate,
ethyl 1-cyclopropylmethyl-3-(o-fluorophenyl)-5-bromo-indole-2-carboxylate,
methyl 1-cyclopropylmethyl-3-(o-fluorophenyl)-6 (or 4)-chloro-indole-2-carboxylate,
ethyl 1-cyclopropylmethyl-3-(o-chlorophenyl)-7-chloro-indole-2-carboxylate,
ethyl 1-cyclopropylmethyl-3-(o-chlorophenyl)-5-chloro-indole-2-carboxylate,
ethyl 1-cyclopropylmethyl-3-(o-bromophenyl)-5-chloro-indole-2-carboxylate,
ethyl 1-cyclopropylmethyl-3-(m-chlorophenyl)-5-chloro-indole-2-carboxylate, ethyl 1-cyclopropylmethyl-3-(p-chlorophenyl)-5-chloro-indole-2-carboxylate,
ethyl 1-cyclobutylmethyl-3-(o-fluorophenyl-5-chloro-indole-2-carboxylate,
ethyl 1-cyclopentylmethyl-3-(o-fluorophenyl)-5-chloro-indole-2-carboxylate,
ethyl 1-cyclohexylmethyl-3-(o-fluorophenyl)-5-chloro-indole-2-carboxylate,
methyl 1-methyl-3-(o-fluorophenyl)-5-chloro-indole-2-carboxylate,
1-ethyl-3-(o-fluorophenyl)-5-chloro-indole-2-carboxylic acid,
1-methyl-3-(o-chlorophenyl)-5-chloro-indole-2-carboxylic acid,
methyl 1-n-propyl-3-(o-fluorophenyl)-5-chloroindole-2-carboxylate,
1-methyl-3-(o-fluorophenyl)-5-bromoindole-2-carboxylic acid,
1-methyl-3-(o-chlorophenylindole)-2-carboxylic acid,
methyl 3-(o-fluorophenyl)-5-chloroindole-2-carboxylate and
1-isobutyl-3-(o-fluorophenyl)-5-chloroindole-2-carboxylic acid.

EXAMPLE 11

To a mixture of 43 g. of ethyl 5-chloro-3-(o-fluorophenyl)-indole-2-carboxylate, 20 g. of potassium hydroxide, 20 ml. of water and 100 ml. of acetone was added dropwise 26 g. dimethyl sulfate below 60°C. The mixture was stirred at room temperature for 1 hour. The solvent was removed under reduced pressure to an oil. The oily residue was washed with water and triturated with ethanol to give 44 g. of ethyl 1-methyl-5-chloro-3-(o-fluorophenyl)-indole-2-carboxylate, m.p. 75°C. A sample of said compound was recrystallized from ethanol, m.p. 76°C.

This procedure was utilized to prepare the following compounds.

methyl 1-methyl-3-(o-chlorophenyl)-5-chloro-indole-2-carboxylate,
methyl 1-methyl-3-(o-fluorophenyl)-5-chloro-indole-2-carboxylate,
ethyl 1-methyl-3-(o-bromophenyl)-5-chloro-indole-2-carboxylate,
ethyl 1-methyl-3-(o-chlorophenyl)-5-chloro-indole-2-carboxylate,
ethyl 1-methyl-3-(m-chlorophenyl)-5-chloro-indole-2-carboxylate,
ethyl 1-methyl-3-(p-chlorophenyl)-5-chloro-indole-2-carboxylate,
ethyl 1-methyl-3-(o-fluorophenyl)-5-chloro-indole-2-carboxylate,
benzyl 1-methyl-3-(o-fluorophenyl)-5-chloro-indole-2-carboxylate,
ethyl 1-ethyl-3-(o-fluorophenyl)-5-chloro-indole-2-carboxylate,
ethyl 1-propyl-3-(o-fluorophenyl)-5-chloro-indole-2-carboxylate,
ethyl 1-methyl-3-(o-fluorophenyl)-6 (or 4)-chloro-indole-2-carboxylate,
methyl 1-methyl-3-(o-chlorophenyl)-7-chloro-indole-2-carboxylate,
ethyl 1-methyl-3-(o-chlorophenyl)-5-bromo-indole-2-carboxylate,
ethyl 1-methyl-3-(o-chlorophenyl)-5-fluoro-indole-2-carboxylate,
ethyl 1-cyclopropylmethyl-3-(o-chlorophenyl)-indole-2-carboxylate,
methyl 1-cyclopropylmethyl-3-(o-fluorophenyl)-5-chloro-indole-2-carboxylate,
ethyl 1-cyclopropylmethyl-3-(o-fluorophenyl)-5-chloro-indole-2-carboxylate,
benzyl 1-cyclopropylmethyl-3-(o-fluorophenyl)-5-chloro-indole-2-carboxylate,
ethyl 1-cyclopropylmethyl-3-(o-fluorophenyl)-5-bromo-indole-2-carboxylate,
ethyl 1-cyclopropylmethyl-3-(m-chlorophenyl)-5-chloro-indole-2-carboxylate,
ethyl 1-cyclopropylmethyl-3-(p-chlorophenyl)-5-chloro-indole-carboxylate,
ethyl 1-cyclobutylmethyl-3-(o-fluorophenyl)-5-chloro-indole-2-carboxylate and
ethyl 1-cyclopentylmethyl-3-(o-fluorophenyl)-5-chloro-indole-2-carboxylate.

EXAMPLE 12

A mixture of 48 g. of ethyl 5-chloro-3-(o-fluorophenyl)-indole-2-carboxylate, 1.8 g. of potassium hydroxide and 60 ml. of ethanol was heated under refluxing condition for 2 hours. The solvent was removed under reduced pressure and the residue was dissolved in 50 ml. of water. After cooling, the solution was made acidic with 2 ml. of conc. hydrochloric acid under cooling. The precipitate which formed was collected by filtration, washed with water and dried to give 4.35 g. of 5-chloro-3-(o-fluorophenyl)-indole-2-carboxylic acid, m.p. 250° – 252°C. (decomp.). The analytical sample was recrystallized from benzene, m.p. 254° – 255°C. (decomp.) Infrared absorption spectrum, $\nu_{max}^{Paraffin}$: 3440, 2700–2300 (broad), 1680, 1555, 1490 cm$^{-1}$.

EXAMPLE 13

To a solution of 19 g. of potassium hydroxide in 350 ml. of methanol was added 45.9 g. of ethyl 5-chloro-3-(o-fluorophenyl)-indole-2-carboxylate and the mixture was refluxed for 5 hours. The solvent was removed under reduced pressure and the residue was dissolved in 400 ml. of water. The solution was treated with charcoal, and made acidic with conc. hydrochloric acid to give 40.1 g. of 5-chloro-3-(o-fluorophenyl)-indole-2-carboxylic acid.

EXAMPLE 14

To a solution of 13.2 g. of potassium hydroxide in 300 ml. of ethanol was added 33.4 g. of ethyl 5-chloro-3-(o-chlorophenyl)-indole-2-carboxylate and the mixture was refluxed for 2 hours. The solvent was removed under reduced pressure and the residue was dissolved in 350 ml. of water. The solution was cooled to 0°C. and made acidic (pH < 1) with 19 ml. of conc. hydrochloric acid under cooling. The mixture was stirred at 0°C. for 1 hour and the precipitate which formed was collected by filtration, washed thoroughly with water, and dried to give 27.6 g. (90.3%) of 5-chloro-3-(o-chlorophenyl)-indole-2-carboxylic acid, m.p. 212° – 213.5°C. (decomp.). The analytical sample was recrystallized from benzene-ethanol, m.p. 215.5° – 216°C. (decomp.) Infrared absorption spectrum, $\nu_{max}^{Paraffin}$: 3415, 2550, 1676 cm$^{-1}$. Elementary analysis (for $C_{15}H_9O_2NCl_2$):

|  | Cl |
| --- | --- |
| Calculated: | 23.16% |
| Found: | 23.02% |

The following compounds were similarly prepared:

3-(o-chlorophenyl)-indole-2-carboxylic acid,
3-(o-fluorophenyl)-indole-2-carboxylic acid,
3-(m-chlorophenyl)-5-chloro-indole-2-carboxylic acid,
3-(p-chlorophenyl)-5-chloro-indole-2-carboxylic acid and
3-(o-fluorophenyl)-6 (or 4)-chloro-indole-2-carboxylic acid.

EXAMPLE 15

A mixture of 23.5 g. of 5-chloro-3-(o-fluorophenyl)-indole-2-carboxylic acid, 50 ml. of acetone, 18.2 g. of potassium hydroxide and 18 ml. of water was heated into a solution. To the cooled mixture was added dropwise 20.5 g. of dimethylsulfate below 50°C. with stirring. The resulting mixture was heated under refluxing condition for 4 hours. After completion of the reaction, the solvent was removed by distillation, and the residue was dissolved in 200 ml. of water. The solution was treated with charcoal, and made acidic with conc. hydrochloric acid under cooling. The yellow precipitate which formed was collected by filtration, washed thoroughly with water and dried to give 24 g. (97.6%) of 1-methyl-5-chloro-3-(o-fluorophenyl)-indole-2-carboxylic acid, m.p. 215.5° – 216°C. (decomp.). the analytical sample was recrystallized from methanol, m.p. 228°C. (decomp.). Elementary analysis (for $C_{16}H_{11}O_2NClF$):

|  | C | H | N |
| --- | --- | --- | --- |
| Calculated: | 63.27% | 3.65% | 4.61% |
| Found: | 63.25% | 3.88% | 4.51% |

The following compounds were similarly prepared:

1-methyl-3-(o-chlorophenyl)-indole-2-carboxylic acid,
1-methyl-3-(o-fluorophenyl)-indole-2-carboxylic acid,
1-methyl-3-(o-chlorophenyl)-5-chloro-indole-2-carboxylic acid and
1-ethyl-3-(o-fluorophenyl)-5-chloro-indole-2-carboxylic acid.

EXAMPLE 16

A mixture of 42.5 g. of ethyl 1-methyl-5-chloro-3-(o-fluorophenyl)-indole-2-carboxylate, 16.6 g. of potassium hydroxide and 400 ml. of ethanol was refluxed for 2.5 hours. The solvent was removed under reduced pressure and the residue was dissolved in 200 ml. of water. The cooled solution was made acidic with 50 ml. of conc. hydrochloric acid under cooling. The precipitate which formed was collected by filtration, washed with water and dried to give 37.7 g. of 1-methyl-5-chloro-3-(o-fluorophenyl)-indole-2-carboxylic acid, m.p. 218°C. The infrared absorption spectrum of this product was identical with that of product obtained in Example 14.

The following compounds were similarly prepared:

1-methyl-3-(o-chlorophenyl)-5-chloro-indole-2-carboxylic acid,
1-methyl-3-(o-bromophenyl)-5-chloro-indole-2-carboxylic acid,
1-methyl-3-(o-fluorophenyl)-indole-2-carboxylic acid,
1-ethyl-3-(o-fluorophenyl)-5-chloro-indole-2-carboxylic acid,
1-cyclopropylmethyl-3-(o-fluorophenyl)-5-bromo-indole-2-carboxylic acid,
1-cyclopropylmethyl-3-(o-fluorophenyl)-6 (or 4)-chloro-indole-2-carboxylic acid,
1-cyclopropylmethyl-3-(o-fluorophenyl)-5-chloro-indole-2-carboxylic acid,
1-cyclopropylmethyl-3-(o-fluorophenyl)-indole-2-carboxylic acid,
1-cyclobutylmethyl-3-(o-fluorophenyl)-5-chloro-indole-2-carboxylic acid,
1-cyclobutylmethyl-3-(o-fluorophenyl)-5-bromo-indole-2-carboxylic acid,
1-cyclopentylmethyl-3-(o-fluorophenyl)-5-chloro-indole-2-carboxylic acid and
1-cyclohexylmethyl-3-(o-fluorophenyl)-5-chloro-indole-2-carboxylic acid.

EXAMPLE 17

A mixture of 30 g. of 5-chloro-3-(o-fluorophenyl)-indole-2-carboxylic acid and 50 ml. of thionyl chloride was heated under refluxing condition for 2 hours. After completion of the reaction, excess thionyl chloride was removed by distillation. The yellowish residue was dissolved in 600 ml. of dry ether and gaseous ammonia was introduced to the solution for 2 hours with stirring under cooling. The precipitate formed was collected by filtration, washed with water and dried to give 19.7 g. of 5-chloro-3-(o-fluorophenyl)-indole-2-carboxamide, m.p. 213° – 214°C. The second crop was obtained from the filtrate. Total yield was 27 g. (90%). The analytical sample was recrystallized from tetrahydrofuranbenzene, m.p. 227° – 228°C. Infrared absorption spectrum, $\nu_{max}^{Paraffin}$: 3460, 3300, 3200, 1659, 1592, 1490 cm$^{-1}$. Elementary analysis (for $C_{15}H_{10}ClFN_2O$):

|  | N | Cl |
| --- | --- | --- |
| Calculated: | 9.71% | 12.31% |
| Found: | 9.84% | 12.23% |

EXAMPLE 18

A mixture of 14.5 g. of 5-chloro-3-(o-fluorophenyl)-indole-2-carboxylic acid and 24 g. of thionyl chloride was refluxed for 2 hours. After completion of the reaction, excess thionyl chloride was removed by distillation under reduced pressure. To the residue was added 200 ml. of dry toluene and gaseous ammonia was introduced to the mixture under ice-cooling with stirring. The precipitate was collected by filtration, washed thoroughly with water and dried to give 14 g. (97.2%) of 5-chloro-3-(o-fluorophenyl)-indole-2-carboxamide, m.p. 213° – 216°C.

EXAMPLE 19

A mixture of 18.2 g. of 1-methyl-5-chloro-3-(o-fluorophenyl)-indole-2-carboxylic acid and 29 g. of thionyl chloride was heated under refluxing condition for 2 hours. After completion of the reaction, excess of thionyl chloride was removed by distillation to obtain an oily residue to which was added 200 ml. of dry toluene. Gaseous ammonia was introduced to the mixture under ice-cooling with stirring. The precipitate which formed was collected by filtration, washed with water and dried to give 11 g. (60.7%) of 1-methyl-5-chloro-3-(o-fluorophenyl)-indole-2-carboxamide, m.p. 159° – 161°C. From the filtrate, the second crops (1.4 g., 7.7%) was obtained, m.p. 155°–156°C. The analytical sample was recrystallized from ethanol, m.p. 16020 160°C. Elementary analysis (for $C_{16}H_{12}ClFN_2O$):

|  | C | H | N | Cl |
|---|---|---|---|---|
| Calculated: | 63.48% | 4.00% | 9.25% | 11.71% |
| Found: | 63.14% | 4.02% | 9.00% | 11.60% |

EXAMPLE 20

A mixture of 27.6 g. of 5-chloro-3-(o-chlorophenyl)-indole-2-carboxylic acid and 32.2 g. of thionyl chloride was heated under refluxing condition for 2 hours. After the reaction was completed, excess of thionyl chloride was removed under reduced pressure. To the residue was added 150 ml. of water, and gaseous ammonia was introduced to the mixture for 15 min. under cooling with stirring. The reaction mixture was stirred at room temperature for 1 hour. The precipitate which formed was collected by filtration, washed thoroughly with water and dried to give 27.7 g. of 5-chloro-3-(o-chlorophenyl)-indole-2-carboxamide. Recrystallization from ethanol gave 21 g. of the product having m.p. 210° – 212°C. Infrared absorption spectrum, $\nu_{max}^{Paraffin}$: 3460, 3290 (shoulder), 3200, 1650, 1590 cm$^{-1}$. Elementary analysis (for $C_{15}H_{10}Cl_2N_2O$):

|  | C | H |
|---|---|---|
| Calculated: | 59.04% | 3.30% |
| Found: | 60.15% | 3.26% |

The following compounds were similarly obtained:

3-(o-fluorophenyl)-indole-2-carboxamide,
3-(o-fluorophenyl)-5-bromo-indole-2-carboxamide,
3-(o-bromophenyl)-5-chloro-indole-2-carboxamide,
3-(p-chlorophenyl)-5-chloro-indole-2-carboxamide,
3-(m-chlorophenyl)-5-chloro-indole-2-carboxamide,
3-(o-fluorophenyl)-6 (or 4)-chloro-indole-2-carboxamide,
1-cyclopropylmethyl-3-(o-chlorophenyl)-5-chloro-indole-2-carboxamide,
1-cyclopropylmethyl-3-(o-fluorophenyl)-5-bromo-indole-2-carboxamide,
1-cyclopropylmethyl-3-(o-fluorophenyl)-5-chloro-indole-2-carboxamide,
1-cyclopropylmethyl-3-(o-fluorophenyl)-6 (or 4)-chloro-indole-2-carboxamide,
1-cyclopropylmethyl-3-(o-fluorophenyl)-7-chloro-indole-2-carboxamide,
1-cyclobutylmethyl-3-(o-fluorophenyl)-5-chloro-indole-2-carboxamide,
1-cyclopentylmethyl-3-(o-fluorophenyl)-5-chloro-indole-2-carboxamide,
1-cyclohexylmethyl-3-(o-fluorophenyl)-5-chloro-indole-2-carboxamide,
1-cyclohexylmethyl-3-(o-fluorophenyl)-5-chloro-indole-2-carboxamide,
1-cyclopropylmethyl-3-(o-fluorophenyl)-5-chloro-indole-2-hydroxamic acid,
1-methyl-3-(o-chlorophenyl)-5-chloro-indole-2-hydroxamic acid,
1-methyl-3-(o-fluorophenyl)-5-bromo-indole-2-carboxamide,
1-methyl-3-(o-fluorophenyl)-5-fluoro-indole-2-carboxamide and
1-ethyl-3-(o-fluorophenyl)-5-chloro-indole-2-carboxamide.

EXAMPLE 21

A mixture of 4.35 g. of 5-chloro-3-(o-fluorophenyl)-indole-2-carboxylic acid and 7.2 g. of thionyl chloride was heated under refluxing condition for 1.5 hours. After completion of the reaction, excess thionyl chloride was removed to give 5-chloro-3-(o-fluorophenyl)-indole-2-carboxylic chloride as a yellow solid. The product was further confirmed by the following process. That is, this crude acid chloride was dissolved in 100 ml. of dry ether, and gaseous ammonia was introduced to the mixture at 10° – 15°C. for 15 min. with stirring. Stirring was continued for additional 1 hour at room temperature. The precipitate formed was collected by filtration, washed with water and dried to give 3.92 g. of 5-chloro-3-(o-fluorophenyl)-indole-2-carboxamide. After recrystallization from tetrahydrofuran-benzene, the product having m.p. 227° – 228°C.

EXAMPLE 22

A mixture of 27.6 g. of 5-chloro-3-(o-chlorophenyl)-indole-2-carboxylic acid and 32.2 g. of thionyl chloride was heated under refluxing condition for 2 hours. After completion of the reaction, excess of thionyl chloride was removed under reduced pressure. the residue was triturated with dry ether to yield 5-chloro-3-(o-chlorophenyl)-indole-2-carboxylic chloride as a yellow solid quantitatively.

The product was further confirmed by the following process, that is, this crude acid chloride was suspended in 150 ml. of dry ether, and gaseous ammonia was intruded to the mixture under cooling. The precipitate which formed was collected by filtration, washed thoroughly with water and dried to give 5-chloro-3-(o-chlorophenyl)-indole-2-carboxamide. Recrystallization from ethanol gave the product having m.p. 210° – 212°C.

The following compounds were similarly prepared:

3-(o-chlorophenyl)-indole-2-carboxylic chloride,
3-(o-fluorophenyl)-indole-2-carboxylic chloride,
3-(p-chlorophenyl)-5-chloro-indole-2-carboxylic chloride,
3-(o-fluorophenyl)-5-chloro-indole-2-carboxylic bromide,
3-(o-fluorophenyl)-5-bromo-indole-2-carboxylic chloride,
3-(o-fluorophenyl)-5-fluoro-indole-2-carboxylic chloride,
3-(o-fluorophenyl)-5-fluoro-indole-2-carboxylic bromide,
3-(o-fluorophenyl)-indole-2-carboxylic bromide,
3-(o-fluorophenyl)-6 (or 4)-chloro-indole-2-carboxylic chloride, 3-(o-fluorophenyl)-7-chloro-indole-2-carboxylic chloride,
1-methyl-3-(o-chlorophenyl)-5-chloro-indole-2-carboxylic chloride,
1 methyl-3-(o-fluorophenyl)-5-chloro-indole-2-carboxylic chloride,
1-ethyl-3-(o-fluorophenyl)-5-chloro-indole-2-carboxylic chloride,
1-cyclopropylmethyl-3-(o-fluorophenyl)-5-chloro-indole-2-carboxylic chloride,
1-cyclobutylmethyl-3-(o-fluorophenyl)-5-chloro-indole-2-carboxylic chloride,
1-cyclopentylmethyl-3-(o-fluorophenyl)15-chloro-indole-2-carboxylic chloride and
1-cyclhexylmethyl-3-(o-fluorophenyl)-5-chloro-indole-2-carboxylic chloride.

EXAMPLE 23

To a mixture of 100 g. of 5-chloro-3-(o-fluorophenyl)-indole-2-carboxamide, 50 g. of potassium hydroxide, 50 ml. of water and 250 ml. of acetone, was added dropwise 65 g. of dimethylsulfate below 40°C. The mixture was stirred at room temperature for 30 min. The solvent was removed under reduced pressure. The residue was washed with water and dried to give 99.1 g. of 1-methyl-5-chloro-3-(o-fluorphenyl)-indole-2-carboxamide, m.p. 145° – 156°. Recrystallization from ethanol was repeated for an analytical sample, m.p. 160°C. The infrared absorption spectrum of this product was identical with that of product obtained in Example 18.

The following compounds were similarly prepared:

1-methyl-3-(o-chlorophenyl)-5-chloro-indole-2-carboxamide,
1-methyl-1(o-fluorophenyl)-5-bromo-indole-2-carboxamide,
1-ethyl-3-(o-fluorophenyl)-indole-2-carboxamide and
1-cyclopropylmethyl-3-(o-fluorophenyl)-indole-2-carboxamide.

EXAMPLE 24

To a solution of 15 g. of 5-chloro-3-(o-fluorophenyl)-indole-2-carboxamide in 150 ml. of dimethylformamide was added 2.49 g. of 61.4% sodium hydride. The mixture was stirred at room temperature and then at 50°C. for 1 hour. After cooling, 8.8 g. of cyclopropylmethylbromide was added to the mixture. The resulting mixture was heated at 100° – 120°C. for 4 hours. After the reaction was completed, 400 ml. of water was added to the reaction mixture. The separated oil product was extracted with ether and the ethereal layer was dried over sodium sulfate and the solvent was removed under reduced pressure to give 1-cyclopropylmethyl-5-chloro-3-(o-fluorophenyl)-indole-2-carboxamide, as a yellow oily substance. This product was used in the next step without further purification.

The following compounds were similarly prepared:

1-cyclopropylmethyl-3-(o-chlorophenyl)-indole-2-carboxamide,
1-cyclopropylmethyl-3-(o-fluorophenyl)-indole-2-carboxamide and
1-cyclopropylmethyl-3-(o-chlorophenyl)-5-chloro-indole-2-carboxamide.

EXAMPLE 25

To a suspension of 20.5 g. of lithium aluminum hydride in 2 l of dry ether, was added 52.3 g. of 5-chloro-3-(o-fluorophenyl)-indole-2-carboxamide with stirring. The mixture was heated under refluxing condition for 6 hours. To the cooled reaction mixture was added dropwise 150 ml. of water with stirring. To the organic layer, was added 40 ml. of conc. hydrochloric acid under cooling. The precipitate which formed was collected by filtration to yield 42.4 g. of 2-aminomethyl-3-(o-fluorophenyl)-5-chloro-indole hydrochloride. The analytical sample was recrystallized from ethanol, m.p. 251° – 253°C. (decomp.). Elementary analysis (for $C_{15}H_{12}N_2ClFHCl$):

|  | N |
|---|---|
| Calculated: | 9.00% |
| Found: | 8.86% |

EXAMPLE 26

To a suspension of 30.8 g. of lithium aluminum hydride in 3 l of dry ether was added 81.7 g. of 1-methl-5-chloro-3-(o-fluorophenyl)-indole-2-carboxamide and the mixture was refluxed for 3 hours with stirring. To the cooled reaction mixture was added dropwise 200 ml. of water with stirring under cooling. To the ethereal layer was added 150 ml. of conc. hydrochloric acid under cooling. The precipitate which formed was collected by filtration to yield 60.5 g. of 1-methyl-2-aminomethyl-3-(o-fluorophenyl)-5-chloro-indole-hydrochloride, m.p. 246°C. (decomp.). Elementary analysis (for $C_{16}H_{15}N_2Cl_2F$):

|  | N | Cl |
|---|---|---|
| Calculated: | 8.61% | 21.81% |
| Found: | 8.53% | 21.91% |

EXAMPLE 27

To a suspension of 3.8 g. of lithium aluminum hydride in 40 ml. of dry ether was added 5.25 g. of 5-chloro-3-(o-chlorophenyl)-indole-2-carboxamide under cooling. The mixture was stirred under refluxing condition for 10 hours and then cooled to 0°C. To the reaction mixture was added dropwise 20 ml. of water under cooling with stirring. The ethereal layer was separated by decantation and the aqueous layer was washed with 150 ml. of ether. The combined ethereal layer was dried and concentrated to dryness to yield 3.75 g. of a yellow solid, which was recrystallized from benzene gave 3 g. of 2-aminomethyl-5-chloro-3-(o-chlorophenyl)-indole, m.p. 145° – 149.5°C.

The following compounds were similarly prepared:

2-aminomethyl-3-(o-chlorophenyl)-indole,
2-aminomethyl-3-(o-fluorophenyl)-indole,
2-aminomethyl-3-(o-chlorophenyl)-5-chloro-indole,
2-aminomethyl-3-(o-fluorophenyl)-5-bromo-indole,
2-aminomethyl-3-(o-fluorophenyl)-6 (or 4)-chloro-indole,
2-aminomethyl-3-(o-fluorophenyl)-7-chloro-indole,
1-methyl-2-aminomethyl-3-(o-fluorophenyl)-indole,
1-methyl-2-aminometyl-3-(o-chlorophenyl)-indole, 1-methyl-2-aminomethyl-3-(o-chlorophenyl)-5-chloro-indole,
1-ethyl-2-aminomethyl-3-(o-fluorophenyl)-5-chloro-indole,
1-methyl-2-aminomethyl-3-(o-fluorophenyl)-5-bromo-indole,
1-methyl-2-aminomethyl-3-(o-fluorophenyl)-5-chloro-indole,
1-cyclopropylmethyl-2-aminomethyl-3-(o-fluorophenyl)-indole,
1-cyclopropylmethyl-2-aminomethyl-3-(o-fluorophenyl)-5-chloro-indole,
1-cyclopropylmethyl-2-aminomethyl-3-(o-fluorophenyl)-5-bromo-indole,
1-cyclopropylmethyl-2-aminomethyl-3-(o-chlorophenyl)-6 (or 4)-chloro-indole,
1-cyclopropylmethyl-2-aminomethyl-3-(o-bromophenyl)-5-chloro-indole,
1-cyclobutylmethyl-2-aminomethyl-3-(o-fluorophenyl)-5-chloro-indole,
1-cyclopropylmethyl-2-aminomethyl-3-(o-fluorophenyl)-5-bromo-indole,
1-cyclopropylmethyl-2-aminomethyl-3-(o-fluorophenyl)-5-fluoro-indole and their hydrochlorides, hydrobromides, sulfates, nitrates and phosphates.

EXAMPLE 28

A mixture of 20.7 g. of 3-(o-fluorphenyl)-5-chloro-indole-2-carboxamide and 107 g. of phosphorous oxychloride was heated under refluxing condition for 20 min. After cooling, the reaction mixture was poured into 800 ml. of ice-water and the mixture was neutralized with ammonium hydroxide. The resulting precipitate was collected by filtration, washed with water and dried to give 18.7 g. of 5-chloro-3-(o-fluorophenyl)-indole-2-carbonitrile, m.p. 185°– 186°C. Yield: 98.7%. Recrystallization from benzene raised the melting point to 187° – 188°C. Infrared absorption spectrum, $\nu_{max}^{Paraffin}$: 3300, 2220, 1546, 1492 cm$^{-1}$. Elementary analysis (for $C_{15}H_8ClFN_2$):

|  | C | H | N |
|---|---|---|---|
| Calculated: | 66.54% | 2.96% | 10.35% |
| Found: | 66.80% | 2.80% | 10.51% |

EXAMPLE 29

A mixture of 15.3 g. of 5-chloro-3-(o-chlorophenyl)-indole-2-carboxamide and 76.8 g. of phosphorous oxychloride was stirred at 90°C. for 20 min. After cooling, the reaction mixture was poured into 500 ml. of ice-water. After neutralization of the mixture with ammonium hydroxide. The precipitate was collected by filtration, washed thoroughly with water and dried to give 13.7 g. (95.8%) of 5-chloro-3-(o-chlorophenyl)-indole-2-carbonitrile, m.p. 166.5° – 167.5°C. Infrared absorption spectrum, $\nu_{max}^{Paraffin}$: 3315, 2230 cm$^{-1}$. Elementary analysis (for $C_{15}H_8N_2Cl_2$):

|  | C | H | N | Cl |
|---|---|---|---|---|
| Calculated: | 62.74% | 2.81% | 9.76% | 24.69% |
| Found: | 62.92% | 2.63% | 9.55% | 24.52% |

The following compounds were similarly prepared:

3-(o-chlorophenyl)-indole-2-carbonitrile,
3-(o-fluorophenyl)-indole-2-carbonitrile,
3-(o-bromophenyl)-5-chloro-indole-carbonitrile,
3-(p-chlorophenyl)-5-chloro-indole-carbonitrile,
3-(o-fluorophenyl)-5-bromo-indole-2-carbonitrile,
3-(o-fluorophenyl)-5-fluoro-indole-2-carbonitrile,
3-(o-fluorophenyl)-6 (or 4)-chloro-indole-2-carbonitrile,
3-(o-fluorophenyl)-7-chloro-indole-2-carbonitrile,
1-methyl-3-(o-fluorophenyl)-5-chloro-indole-2-carbonitrile,
1-methyl-3-(o-chlorophenyl)-5-chloro-indole-2-carbonitrile,
1-ethyl-3-(o-fluorophenyl)-5-chloro-indole-2-carbonitrile,
1-cyclopropylmenthyl-3-(o-fluorophenyl)-indole-2-carbonitrile,
1-cyclopropylmethyl-3-(o-fluorophenyl)-5-chloro-indole-2-carbonitrile,
1-cyclobutylmethyl-3-(o-fluorophenyl)-5-chloro-indole-2-carbonitrile,
1-cyclopentylmethyl-3-(o-fluorophenyl)-5-chloro-indole-2-carbonitrile and
1-cyclohexylmethyl-3-(o-fluorophenyl)-5-chloro-indole-2-carbonatrile.

EXAMPLE 30

To a suspension of 2 g. of lithium aluminum hydride in 300 ml. of dry ether, was added 3.52 g. of 5-chloro-3-(o-fluorophenyl)-indole-2-carbonitrile and the mixture was heated under refluxing condition for 4 hours with stirring. After completion of the reaction, the reaction mixture was cooled with ice, and water was added dropwise to the mixture with stirring to decompose excess lithium aluminum hydride. The ethereal layer was separated, dried over sodium sulfate and the solvent was removed by distillation under reduced pressure to give 3.3 g. (92.5%) of 2-aminomethyl-3-(o-fluorophenyl)-5-chloro-indole, m.p. 159° – 161°C. Recrystallization from benzene-petroleum ether raised the melting point to 162° – 163°C. Infrared absorption spectrum, $\nu_{max}^{Paraffin}$: 3360, 3290, 3130, 1555, 1496 cm$^{-1}$. Elementary analysis (for $C_{15}H_{12}ClFN_2$):

|  | C | H | N |
|---|---|---|---|
| Calculated: | 65.57% | 4.37% | 10.20% |
| Found: | 65.89% | 4.20% | 9.98% |

The following compounds were similarly prepared:

2-aminomethyl-3-(o-fluorophenyl)-indole,
2-aminomethyl-3-(o-chlorophenyl)-5-chloro-indole,
2-aminomethyl-3-(o-fluorophenyl)-5-chloro-indole,
2-aminomethyl-3-(o-fluorophenyl)-5-bromo-indole,
2-aminomethyl-3-(o-fluorophenyl)-5-fluoro-indole,
2-aminomethyl-3-(o-fluorophenyl)-6 (or 4)-chloro-indole,
2-aminomethyl-3-(o-fluorophenyl)-7-chloro-indole,
1-methyl-2-aminomethyl-3-(o-chlorophenyl)-5-chloro-indole,
1-methyl-2-aminomethyl-3-(o-fluorophenyl)-5-chloro-indole,
1-ethyl-2-aminomethyl-3-(o-fluorophenyl)-5-chloro-indole, 1-cyclopropylmethyl-2-aminomethyl-3-(o-fluorophenyl)-indole,
1-cyclopropylmethyl-2-aminomethyl-3-(o-fluorophenyl)-5-chloro-indole,
1-cyclobutylmethyl-2-aminomethyl-3-(o-fluorophenyl)-5-chloro-indole,
1-cyclopentylmethyl-2-aminomethyl-3-(o-fluorophenyl)-5-chloro-indole,
1-cyclohexylmethyl-2-aminomethyl-3-(o-fluorophenyl)-5-chloro-indole
and their hydrochlorides, hydrobromides, sulfates, phosphates and acetates.

EXAMPLE 31

To a mixture of 5.2 g. of 5-chloro-3-(o-fluorophenyl)-indole-2-carbonitrile, 18 ml. of acetone, 3.8 g. of potassium hydroxide and 38 ml. of water was added dropwise 4.9 g. of dimethylsulfate below 50°C. Stirring was continued for an additional 30 min. and then the acetone was removed under reduced pressure. The residue was diluted with water and filtered to give 5 g. of 1-methyl-5-chloro-3-(o-fluorophenyl)-indole-2-carbonitrile.

This 1-methyl-5-chloro-3-(o-fluorophenyl)-indole-2-carbonitrile was added to a suspension of 3 g. of lithium aluminum hydride in 400 ml. of dry ether. The mixture was heated under refluxing condition for 5 hours with stirring. After the reaction was completed, the reaction mixture was cooled to 0°C. and water was added dropwise to the mixture with stirring to decompose excess lithium aluminum hydride. The ethereal layer was separated and dried over sodium sulfate. To the ethereal layer was introduced dry hydrogen chloride under cooling. The precipitate which formed was collected by filtration to give 1-methyl-2-aminomethyl-3-(o-fluorophenyl)-5-chloro-indole hydrochloride, m.p. 246°C. (decomp.).

EXAMPLE 32

A solution of 3 g. of chromic anhydride in 3 ml. of water was added dropwise to a solution of 2.9 g. of 2-amino-methyl-5-chloro-3-(o-chlorophenyl)-indole in 20 ml. of acetic acid. The mixture was stirred at room temperature for 26 hours. To the reaction mixture was added 10 ml. of water and then 50 ml. of 28% ammonium hydroxide with stirring under cooling. The resulting mixture was extracted with chloroform and the organic layer was dried and concentrated under reduced pressure. The residue was purified by chromatography on silica gel to give 7-chloro-5-(o-chloro-phenyl)-1,3-dihydro-2H-1,4-benzodiazepine-2-one, m.p. 199° – 201°C.

EXAMPLE 33

A solution of 40 g. of chromic anhydride in 30 ml. of water was added dropwise to a suspension of 40 g. of 2-aminomethyl-5-chloro-3-(o-fluorophenyl)-indole hydrochloride in 400 ml. of acetic acid at 15°–20°C. The mixture was stirred at room temperature overnight. The reaction mixture was added dropwise to a mixture of 850 ml. of 28% ammonium hydroxide, 850 ml. of water and 700 ml. of methylene chloride with stirring under cooling. The aqueous layer was separated and extracted with methylene chloride. The organic layer was combined and concentrated in vacuo. The residue was triturated with benzene, and then filtered, washed with benzene and dried to give 18 g. of crude product which was taken up with ethanolic hydrogen chloride to yield 4.5 g. of 7-chloro-5-(o-fluorophenyl)-1,3-dihydro-2H-1,4-benzodiazepine-2-one hydrochloride, m.p. 235°C. (decomp.).

The filtration and washing were combined and evaporated in vacuo. To the residue was added toluene and the mixture was heated under refluxing condition. The solvent was removed in vacuo and the residue was washed with ethanol to give 12 g. of crude product, which was treated with ethanolic hydrogen chloride to yield 11.5 g. of 7-chloro-5-(o-fluorophenyl)-1,3-dihydro-2H-1,4-benzodiazepine-2-one hydrochloride, m.p. 236°C. (decomp.).

This hydrochloride was treated with ammonium hydroxide, and then extracted with chloroform. The solvent was removed in vacuo to yield 8.3 g. of free 7-chloro-5-(o-fluorophenyl)-1,3-dihydro-2H-1,4-benzodiazepine-2-one, m.p. 202° – 203°C. Recrystallization from ethanol raised the melting point to 204° – 205°C. Infrared absorption spectrum, $\nu_{max}^{Paraffin}$: 1690, 1618 cm$^{-1}$. Elementary analysis (for $C_{15}H_{10}N_2OClF$):

|  | C | H | N |
|---|---|---|---|
| Calculated: | 62.40% | 3.49% | 9.70% |
| Found: | 62.54% | 3.38% | 9.43% |

EXAMPLE 34

A solution of 3 g. of chromic anhydride in 3 ml. of water was added dropwise to a suspension of 3.6 g. of 1-cyclopropylmethyl-2-aminomethyl-3-(o-fluorophenyl)-5-chloro-indole hydrochloride below 25°C. After stirring at room temperature overnight, the reaction mixture was poured into ice-water, made alkaline with aqueous ammonia solution, and extracted with methylene chloride. The organic layer was dried over sodium sulfate and the solvent was removed under reduced pressure. The residue was purified on chromatography to yield 1-cyclopropylmethyl-5-(o-fluorophenyl)-7-chloro-1,3-dihydro-2H-1,4-benzodiazepine-2-one. Ultraviolet absorption spectrum, $\lambda_{max}$ 229, 314 m$\mu$. Infrared absorption spectrum, $\nu_{max}^{KBR}$ 3080, 1670 cm$^{-1}$. Elementary analysis (for $C_{19}H_{16}N_2OClF$):

|  | C | H | N |
|---|---|---|---|
| Calculated: | 61.57% | 4.70% | 8.17% |
| Found: | 61.42% | 4.53% | 8.04 |

EXAMPLE 35

A solution of 60 g. of chromic anhydride in 40 ml. of water was added dropwise to a suspension of 60 g. of 2-aminomethyl-1-methyl-5-chloro-3-(o-fluorophenyl)-indole hydrochloride in 600 ml. of acetic acid. The mixture was stirred at room temperature overnight. To the reaction mixture was added 1.1 l of ether and 1 l of water and then 800 ml. of 28% ammonium hydroxide, in small portions. The ethereal layer was separated, washed with water, dried and concentrated under reduced pressure. The residue (51.8 g.) was dissolved in 100 ml. of ethanol, and 100 ml. of 20% ethanolic hydrogen chloride was added to the solution and the mixture was cooled. The precipitate was collected by filtration to yield 46.5 g. of 1-methyl-7-chloro-5-(o-fluorophenyl)-1,3-dihydro-2H-1,4-benzodiazepine-2-one hydrochloride, m.p. 218°C. (decomp.). Recrystallization from ethanol raised the melting point to 218.5° – 219°C. (decomp.). Elementary analysis (for $C_{16}H_{12}N_2OClF\cdot HCl$):

|  | C | N |
|---|---|---|
| Calculated: | 56.65% | 8.26% |
| Found: | 56.72% | 8.13% |

The following compounds were similarly prepared:

5-(o-chlorophenyl)-1,3-dihydro-2H-1,4-benzodiazepine-2-one,
5-(o-fluorophenyl)-1,3-dihydro-2H-1,4-benzodiazepine-2-one,
5-(o-chlorophenyl)-7-chloro-1,3-dihydro-2H-1,4-benzodiazepine-2-one,
5-(o-fluorophenyl)-7-chloro-1,3-dihydro-2H-1,4-benzodiazepine-2-one,
5-(o-bromophenyl)-7-chloro-1,3-dihydro-2H-1,4-benzodiazepine-2-one,
5-(m-chlorophenyl)-7-chloro-1,3-dihydro-2H-1,4-benzodiazepine-2-one,
5-(p-chlorophenyl)-7-bromo-1,3-dihydro-2H-1,4-benzodiazepine-2-one,
1-methyl-5-(o-chlorophenyl)-7-chloro-1,3-dihydro-2H-1,4-benzodiazepine-2-one,
1-methyl-5-(o-fluorophenyl)-7-chloro-1,3-dihydro-2H-1,4-benzodiazepine-2-one,
1-methyl-5-(o-fluorophenyl)-7-bromo-1,3-dihydro-2H-1,4-benzodiazepine-2-one,
1-ethyl-5-(o-fluorophenyl)-7-chloro-1,3-dihydro-2H-1,4-benzodiazepine-2-one,
1-propyl-5-(o-fluorophenyl)-7-chloro-1,3-dihydro-2H-1,4-benzodiazepine-2-one,
1-cyclopropylmethyl-5-(o-fluorophenyl)-1,3-dihydro-2H-1,4-benzodiazepine-2-one,
1-cyclopropylmethyl-5-(o-chlorophenyl)-1,3-dihydro-2H-1,4-benzodiazepine-2-one,
1-cyclopropylmethyl-5-(o-fluorophenyl)-7-chloro-1,3-dihydro-2H-1,4-benzodiazepine-2-one,
1-cyclopentylmethyl-5-(o-fluorophenyl)-7-chloro-1,3-dihydro-2H-1,4-benzodiazepine-2-one,
1-cyclopropylmethyl-5-(o-chlorophenyl)-7-chloro-1,3-dihydro-2H-1,4-benzodiazepine-2-one,
1-cyclopropylmethyl-5-(o-fluorophenyl)-9-chloro-1,3-dihydro-2H-1,4-benzodiazepine-2-one,
1-cyclopropylmethyl-5-(o-fluorophenyl)-7-bromo-1,3-dihydro-2H-1,4-benzodiazepine-2-one,
1-cyclobutylmethyl-5-(o-fluorophenyl)-7-chloro-1,3-dihydro-2-1,4-benzodiazepine-2-one,
1-cyclopentylmethyl-5-(o-fluorophenyl)-7-bromo-1,3-dihydro-2H-1,4-benzodiazepine-2-one and
1-cyclohexylmethyl-5-(o-fluorophenyl)-7-chloro-1,3-dihydro-2H-1,4-benzodiazepine-2-one.

We claim:
1. A compound of the formula

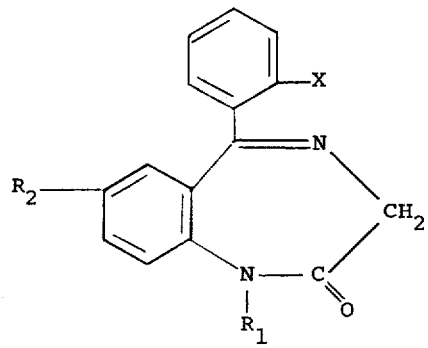

wherein $R_1$ is cyclopropylmethyl, $R_2$ is chlorine and X is a chlorine or fluorine atom.

2. 1-cyclopropylmethyl-5-(o-fluorophenyl)-7-chloro-1,3-dihydro-2H-1,4-benzodiazepin-2-one.

3. 1-Cyclopropylmethyl-5-(o-chlorophenyl)-7-chloro-1,3-dihydro-2H-1,4-benzodiazepin-2-one.

* * * * *